United States Patent
Leigh et al.

(10) Patent No.: US 10,725,250 B1
(45) Date of Patent: Jul. 28, 2020

(54) INDIVIDUALLY BLIND-MATED MODULAR OPTICAL CONNECTORS OF OPTICAL FERRULE ARRAYS IN A GROUP OF SUB-HOUSING PAIRS WITHIN A MAIN HOUSING PAIR

(71) Applicant: Hewlett Packard Enterprise Development LP, Houston, TX (US)

(72) Inventors: Kevin B. Leigh, Houston, TX (US); Everett R. Salinas, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/509,978

(22) Filed: Jul. 12, 2019

(51) Int. Cl.
G02B 6/38 (2006.01)
G02B 6/44 (2006.01)

(52) U.S. Cl.
CPC ......... *G02B 6/3885* (2013.01); *G02B 6/3821* (2013.01); *G02B 6/3882* (2013.01); *G02B 6/4452* (2013.01)

(58) Field of Classification Search
CPC .. G02B 6/3885; G02B 6/4452; G02B 6/3882; G02B 6/3821
See application file for complete search history.

(56) References Cited

U.S. PATENT DOCUMENTS

| | | | |
|---|---|---|---|
| 8,702,318 B2 | 4/2014 | Isenhour et al. | |
| 9,482,827 B2 | 11/2016 | Haase et al. | |
| 9,645,317 B2 * | 5/2017 | Isenhour | G02B 6/32 |
| 10,139,571 B2 * | 11/2018 | Haase | G02B 6/3869 |
| 10,168,486 B2 * | 1/2019 | Haase | G02B 6/3869 |
| 10,481,335 B2 * | 11/2019 | Isenhour | G02B 6/4452 |
| 10,620,383 B2 * | 4/2020 | Smith | G02B 6/3885 |
| 2013/0308908 A1 * | 11/2013 | Isenhour | G02B 6/4447 385/61 |
| 2014/0029907 A1 * | 1/2014 | Isenhour | G02B 6/3834 385/135 |
| 2014/0037251 A1 * | 2/2014 | Isenhour | G02B 6/3834 385/79 |
| 2015/0234126 A1 * | 8/2015 | Haase | G02B 6/40 385/59 |
| 2017/0017044 A1 * | 1/2017 | Haase | G02B 6/40 |
| 2017/0017047 A1 * | 1/2017 | Haase | G02B 6/3885 |

(Continued)

OTHER PUBLICATIONS

Major Custom Cable; "Fiber Cassettes"; 2018/2019 Catalog; 5 pages.

*Primary Examiner* — Andrew Jordan
(74) *Attorney, Agent, or Firm* — Sheppard Mullin Richter & Hampton LLP

(57) ABSTRACT

A modular optical connector system is provided for connecting a plurality of different rack enclosures, separate racks, and/or sets of racks. A first plenum has a receptacle configured to connect with a plug in a second plenum. The receptacle comprises a plurality of receptacle sub-housings, each receptacle sub-housing comprising an array of optical ferrules configured to mate with corresponding optical ferrules in a plurality of plug sub-housings of the plug. Each plug sub-housing having a lever tab rotatably connected and configured to mate with mating components on the corresponding receptacle sub-housing. Each sub-housing pair remaining unconnected after the receptacle and plug are mated, each sub-housing pair being independently mated.

20 Claims, 18 Drawing Sheets

(56) References Cited

U.S. PATENT DOCUMENTS

| | | |
|---|---|---|
| 2017/0168248 A1 | 6/2017 | Hayauchi et al. |
| 2018/0217337 A1 | 8/2018 | Smith et al. |
| 2019/0094471 A1* | 3/2019 | Haase .................. G02B 6/3869 |

* cited by examiner

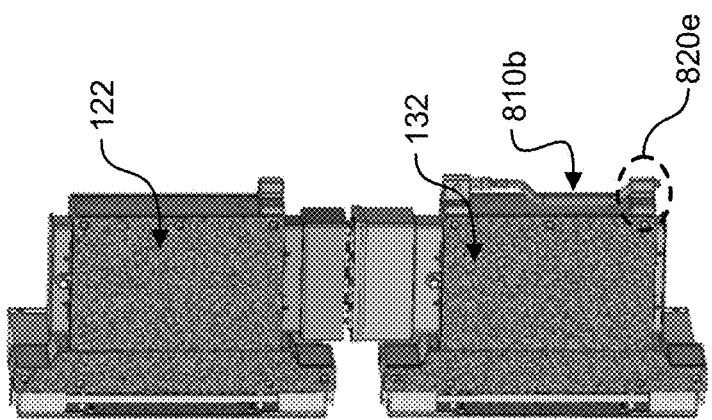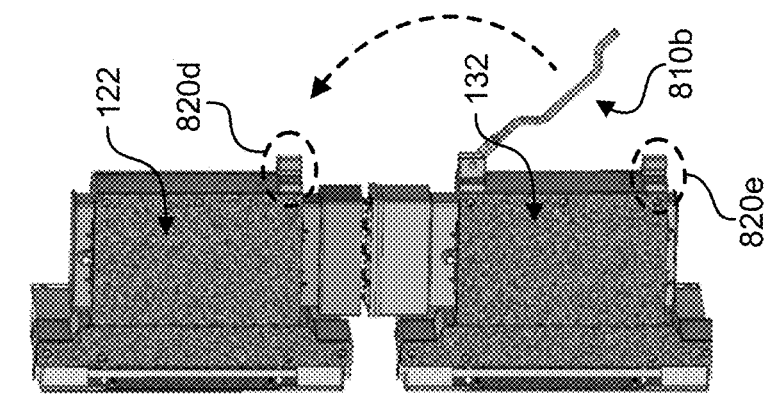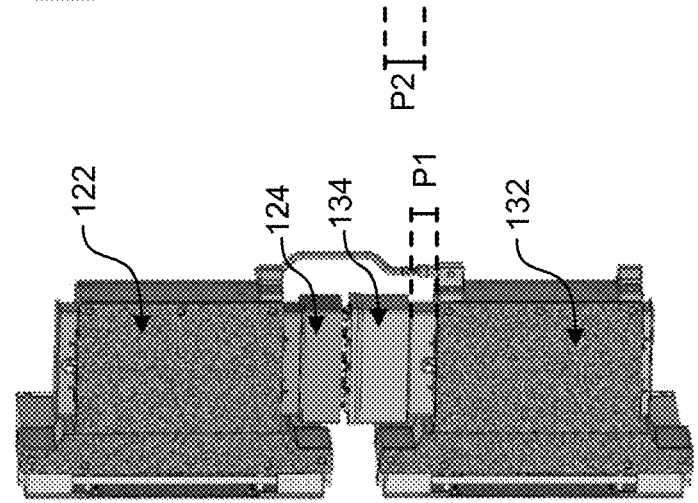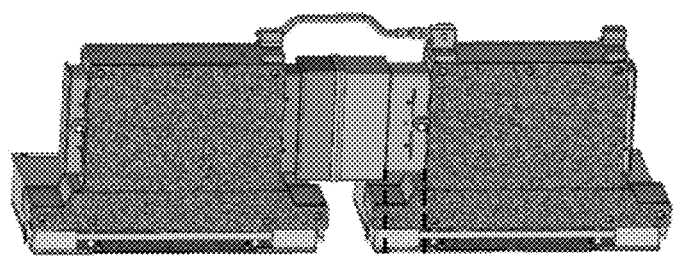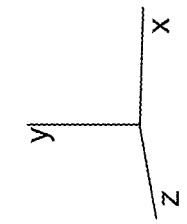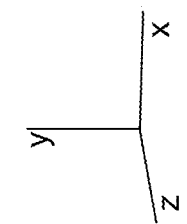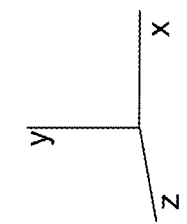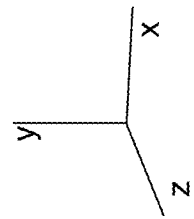
FIG. 9A  FIG. 9B  FIG. 9C  FIG. 9D

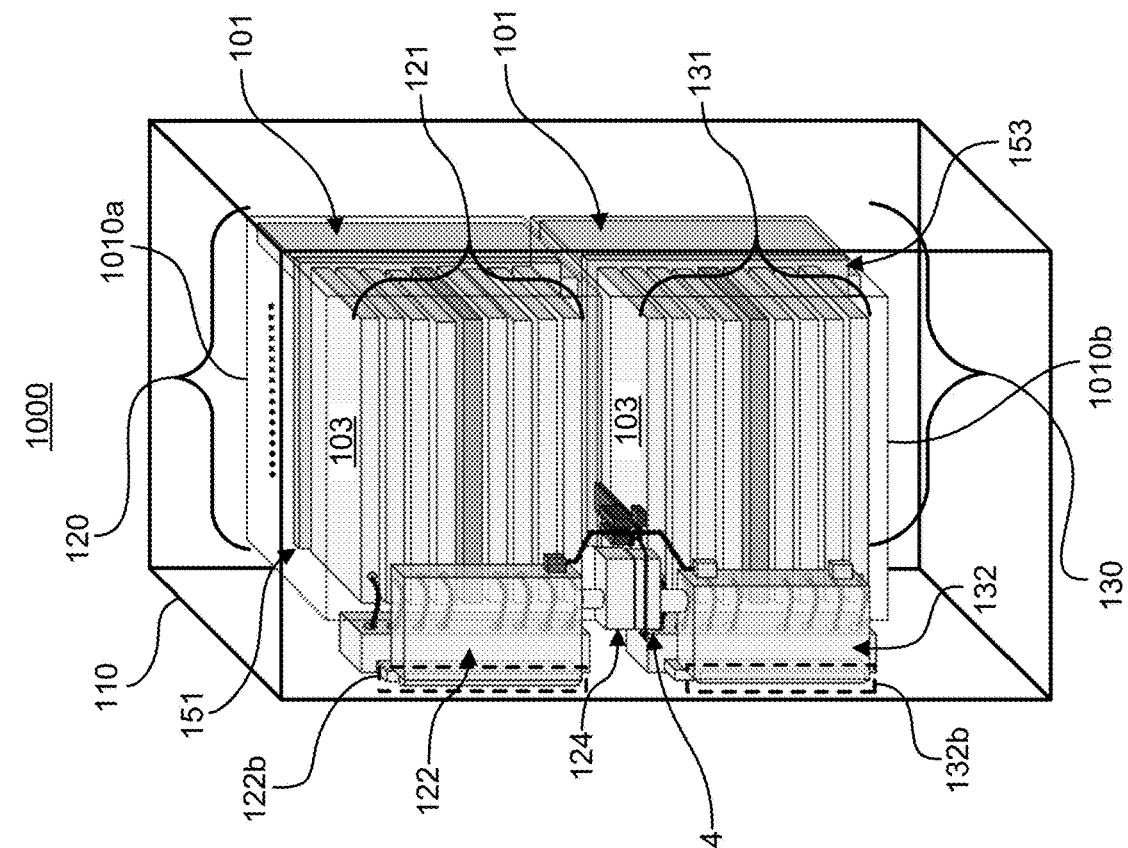
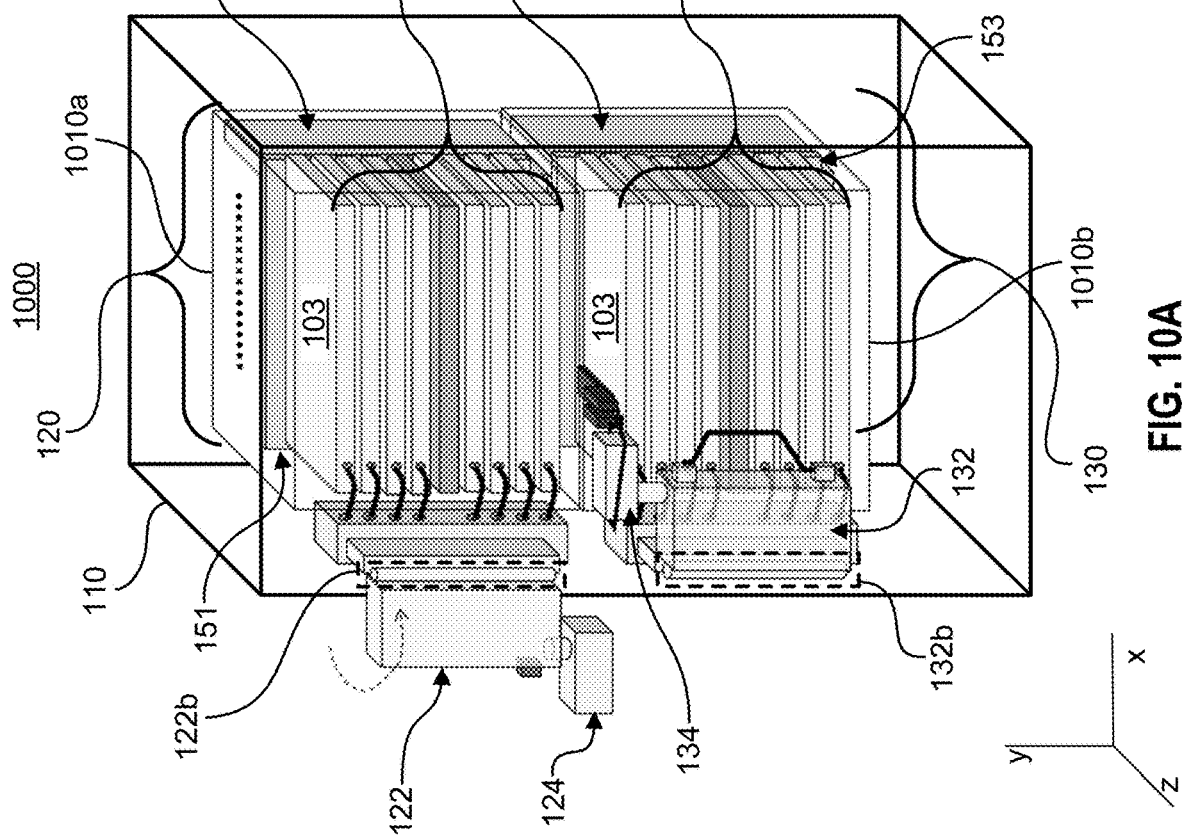
FIG. 10B
FIG. 10A

INDIVIDUALLY BLIND-MATED MODULAR OPTICAL CONNECTORS OF OPTICAL FERRULE ARRAYS IN A GROUP OF SUB-HOUSING PAIRS WITHIN A MAIN HOUSING PAIR

DESCRIPTION OF RELATED ART

Existing methods of creating optical communication systems require a significant amount of space on equipment faceplates and in-rack cable routing areas. With the number of optical fibers increasing exponentially with scale, e.g., for high performance computing systems, it becomes quite costly to implement optical networks in rack configurations comprising a large number of compute and memory nodes. Not only does each optical connector requires a much greater real estate on faceplates (to accommodate connector housing size, connector housing retentions, cable labels and user-friendly features), but a large number of optical fiber cables are required to make all the necessary connections for all-to-all connectivity. This leads to increased size and costs for such systems, including costly upfront installation costs, high recurring maintenance costs, and increases the risk of human errors in connecting all of the fibers correctly. It is common for optical systems to have large cable bundles forming a cable "waterfall," making it difficult to reach and, in many cases, see the optical connector clearly on the faceplate. Accordingly, current solutions can be prohibitively expensive for many potential implementers and are excessively difficult to maintain.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Some of the figures included herein illustrate various embodiments of the invention from different viewing angles. Although the accompanying descriptive text may refer to elements depicted therein as being on the "top," "bottom" or "side" of an apparatus, such references are merely descriptive and do not imply or require that the invention be implemented or used in a particular spatial orientation unless explicitly stated otherwise.

FIG. 9A shows a first stage of mating an example receptacle and an example plug in accordance with embodiments of the technology disclosed herein.

FIG. 9B shows a second stage of mating an example receptacle and an example plug in accordance with embodiments of the technology disclosed herein.

FIG. 9C shows a third stage of mating an example receptacle and an example plug in accordance with embodiments of the technology disclosed herein.

FIG. 9D shows a fourth stage of mating an example receptacle and an example plug in accordance with embodiments of the technology disclosed herein.

FIG. 10A illustrates another example environment in which embodiments of the technology disclosed herein can be implemented.

FIG. 10B illustrates the example environment of FIG. 10A in a mated position in accordance with embodiments of the technology disclosed herein.

Figure 1:
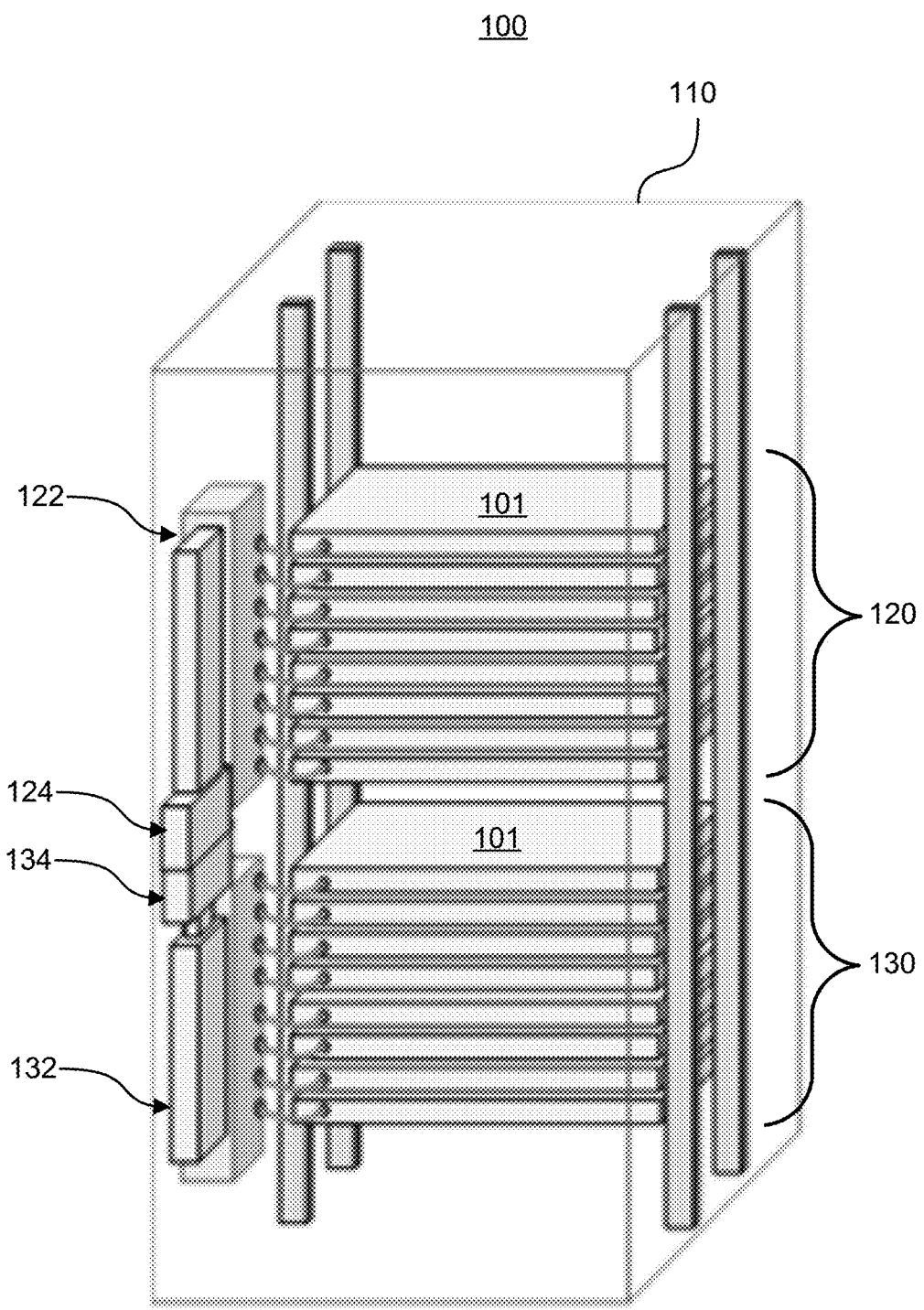
FIG. 1 an example environment in which embodiments of the technology disclosed herein can be implemented.

The figures are not exhaustive and do not limit the present disclosure to the precise form disclosed.

DETAILED DESCRIPTION

New applications are emerging that require a large number of optical fibers and corresponding optical connectors to be mated within equipment racks having multiple system nodes, where these system nodes may be compute node, memory nodes, switch nodes, or a combination of them. One way to solve faceplate real estate problem is to use integrated optics inside systems, and interconnect these systems in a rack using high-density fibers and connectors. Another way to solve faceplate real estate problem is to directly and orthogonally blindmate a set of nodes at the front of an enclosure to another set of nodes at the rear of the enclosure within a rack so that all the "front" nodes will connect to all the "rear" nodes. However, the nodes within an enclosure to be interconnected to one another by means of directly and orthogonally blindmated between the front and the rear nodes may not be practical because a rack environment may not have enough real estate, power or cooling capacities. In addition, connection topologies for applications may vary in such a way that fixed connections enforced by directly orthogonally blindmating nodes may not be feasible in a rack. Furthermore, the nodes need to be interconnected may be installed in multiple racks.

Patch panels and in-rack fiber shuffles for intra-rack connectivity have been used to provide such connectivity. However, these solutions require their own space within the racks, taking up at least one rack unit (U). Although existing patch panel methods may allow devices in multiple racks to be interconnected, these devices may require an entire rack themselves to connect only two racks together in many implementations. Moreover, these solutions, especially with respect to fiber shuffles, are expensive and inflexible. Fiber shuffles incur a large upfront design cost requiring all the connections for many-to-many communication to be particularly laid out and, once designed and manufactured, the installed fiber shuffles cannot be reconfigured for a needed change in the connection setup.

Embodiments of the technology disclosed herein provide a plenum-based secured, low-cost, highly-scalable, high-density modular optical connector system for rack and row scale implementations. As disclosed in greater detail below, embodiments in accordance with the present disclosure provides a physically secured connection, preventing connection discontinuity due to environmental and/or operating conditions, while reducing the chance of connector damages due to over-application of force during mating of the optical ferrules. A plurality of different rack enclosures, separate racks, and/or sets of racks can be connected through associated plenums in accordance with the technology disclosed herein. Each modular ferrule array connector system comprises a first plenum having a receptacle and a second plenum having a plug. Each receptacle comprises a plurality of modular receptacle sub-housings, each comprising an array of receptacle optical ferrules. Each plug comprises a corresponding modular plug sub-housing for each modular receptacle sub-housing, resulting in a plurality of sub-housing pairs within the connected plenum structure. Each plug sub-housing comprises a plurality of plug optical ferrules configured to mate with the receptacle optical ferrules of the receptacle sub-housing. The connector system can be mated in multiple stages, a first stage where a receptacle main housing and plug main housing are mated together, leaving each of the modular sub-housing pairs unmated. Each individual sub-housing pair can be mated independently of any other sub-housing pair. This allows isolation of mating force to be between each of the mating sub-housing pairs, and provides greater control over the force applied to the arrays of optical ferrules. Adequate mating force is needed for each optical ferrule pair to be mated for reliable optical signal communication, and actual mating force may vary depending on the ferrule types used.

Embodiments of the technology disclosed herein provide scalable methods for varying number of sub-housing pairs for various types of ferrule types and counts. As aforementioned, a front set of nodes may optically connect to a rear set of nodes in an enclosure through a midplane of the enclosure. In various embodiments, the technology disclosed herein enables the optical connections among different sets of various number of nodes to be extended away from the midplane, allowing highly scalable system configurations though a rear-rack implementation, and above the rack implementation, or a rack as plenum implementation.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

FIG. 1 illustrates an example environment 100 in which embodiments of the technology disclosed herein can be implemented, in accordance with the present disclosure. As illustrated, the example environment 100 includes a rack 110 comprising a plurality of nodes 101. In various embodiments, nodes 101 may comprise computing equipment, including but not limited to processing nodes, acceleration nodes, servers, memory nodes, non-volatile storage nodes, switches, routers, bridges, among others. Embodiments of the present disclosure are applicable with any architectural environment requiring the inter- or intra-connection of rack equipment, and should not be interpreted as limited to any specific type of equipment. As shown in FIG. 1, a first node-set 120 comprises a first subset of nodes 101 and a second node-set 130 comprises a second subset of nodes 101.

As illustrated, first node-set 120 is connected to second node-set 130 to provide intra-connectivity within rack 110. In various embodiments, the optical connections from first node-set 120 can be routed to a first rack plenum 122 and the optical connections from second node-set 130 can be routed to a second rack plenum 132. In various embodiments, first rack plenum 122 and second rack plenum 132 can be disposed on an interior rear portion of rack 110, while in other embodiments each plenum 122, 132 can be disposed on an external side of rack 110. When disposed on the exterior of rack 110, first rack plenum 122 and second rack plenum 132 enable the optical connections between first node-set 120 and second node-set 130 to be moved from within the interior of rack 110 to the exterior of rack 110. By allowing the connections between node-set 120 and node-set 130 to be within rack 110 or outside of rack 110, such embodiments in accordance with the present disclosure facilitates easier scaling, installation and maintenance of environment 100. In some embodiments, first rack plenum 122, second rack plenum 132, or both can be pivotable around a joint, configured to move from a first position into a second position (discussed in greater detail with respect to FIGS. 10A and 10B).

First rack plenum 122 and second rack plenum 130 are configured to be communicatively coupled, optically connecting first node-set 120 and second node-set 130. In various embodiments, first rack plenum 122 can comprise a receptacle 124 disposed on a connector end of first rack plenum 122, and second rack plenum 132 comprises a plug 134 disposed on a connector end of second rack plenum 132. Receptacle 124 and plug 134 can be configured to mate, resulting in optical fibers from first node-set 120 optically coupling with optical fibers from second node-set 130. In various embodiments, receptacle 124 may be disposed on the connector end of second rack plenum 132 while plug 134 is disposed on the connector end of first rack plenum 122.

Figure 2:
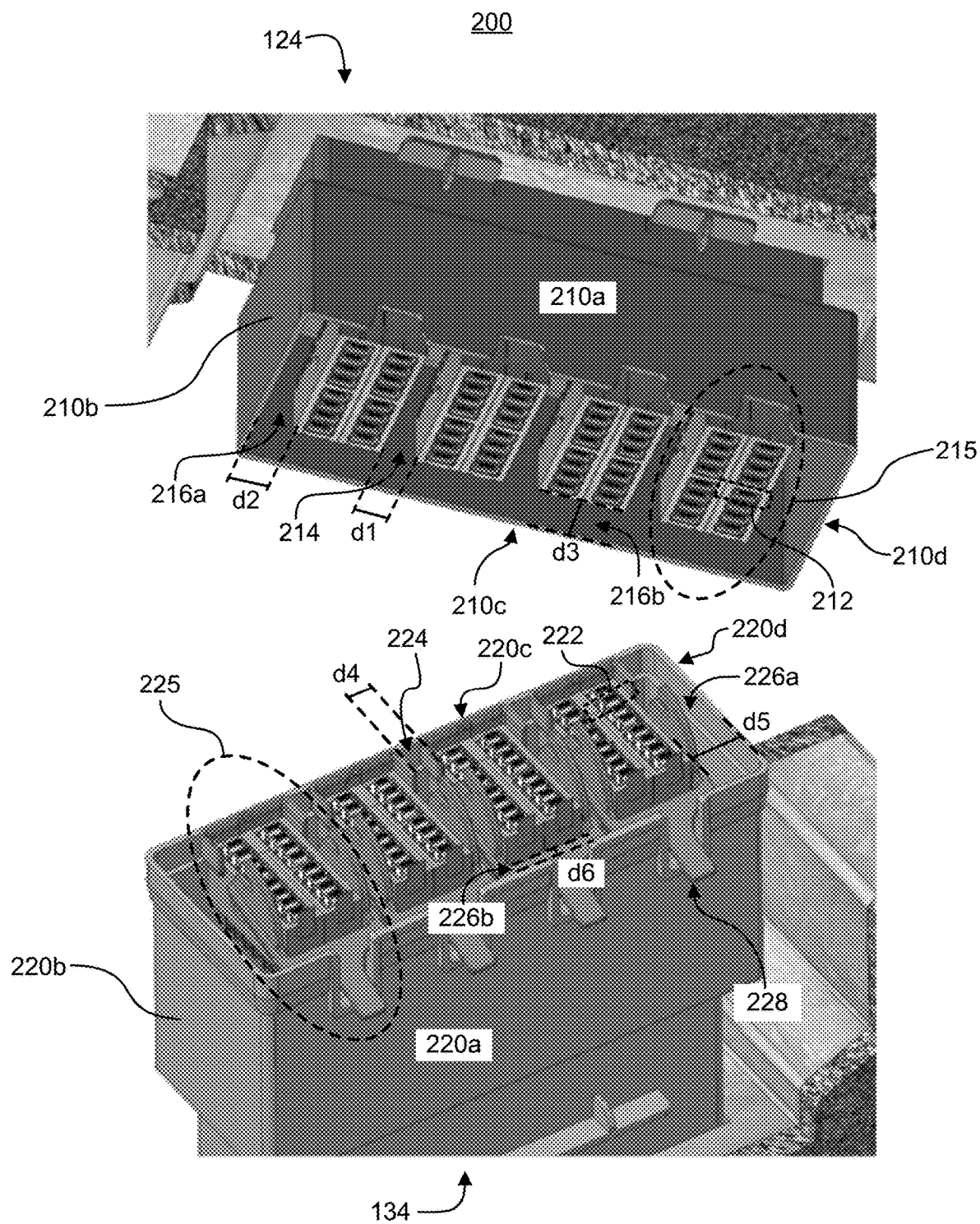
FIG. 2 a perspective view of example modular ferrule array connector system in accordance with embodiments of the technology disclosed herein.

FIG. 2 is a perspective view of example modular ferrule array connector system 200 in accordance with embodiments of the present disclosure. Where elements between figures are identified using the same references it should be interpreted that descriptions with respect to the reference applies equally in all instances of its use, unless otherwise stated. Example module ferrule array connector system 200 provides a modular configuration of receptacle 124 and plug 134 discussed with respect to FIG. 1. As shown in FIG. 2, receptacle 124 comprises a receptacle main housing 210 (comprising side walls 210a, 210b, 210c, 210d) and one or more receptacle sub-housings 215. Each receptacle sub-housing 215 can be separated by a receptacle sub-housing gap 214 having a width d1. In various embodiments, each receptacle sub-housing gap 214 between receptacle sub-housings 215 can have the same width d1, while in other embodiments one or more receptacle sub-housings gaps 214 can have a width d1 different from one or more of the other sub-housing gaps 214. The receptacle main housing 210 comprises a first receptacle housing gap 216a and a second receptacle housing gap 216b. First receptacle housing gap 216a and second receptacle housing gap 216b ensure a space between the side walls 210a, 210b, 210c, 210d of receptacle main housing 210 and each of receptacle sub-housings 215. First receptacle housing gap 216a can have a width d2 between side wall 210b and a receptacle sub-housing 215. Although illustrated as being disposed near side wall 210b, another first receptacle housing gap 216a is disposed between side wall 210d and another receptacle sub-housing 215 (not shown in FIG. 2). Second receptacle housing gap 216b can have a width d3 between side wall 210c and each of receptacle sub-housings 215 within receptacle main housing 210. Although illustrated as being disposed near side wall 210c, another second receptacle housing gap 216b is disposed between side wall 210a and each of receptacle sub-housings 215. In various embodiments, width d2 and width d3 can be the same size, whereas in other embodiments width d2 can be a different size compared to width d3. The space between each receptacle sub-housing 215 and side walls 210a, 210b, 201c, 210d of receptacle main housing 210 allows each receptacle sub-housing 215 to serve as a separate module within receptacle main housing 210.

Each receptacle sub-housing 215 comprises a plurality of first optical ferrules 212. In various embodiments, each first optical ferrule 212 can be configured to accept the cladded core of at least one optical fiber routed within first rack plenum 122. In some embodiments, first optical ferrules 212 can be configured to accept any type of optical fiber ferrule known in the art, including but not limited to, simplex fiber, duplex fiber, micro-MT, physical contact MT, PRIZM MT, or non-contact MT, among others. Optical ferrule connectors provide protection for the core of the optical fiber, but also and a volumetric impact, incurring cost through increased size for the end of the optical fiber. In various embodiments, each first optical ferrule 212 can be configured to accept at least one bare optical fiber. By enabling use of bare optical fibers (i.e., without jacket covers), embodiments in accordance with the present disclosure can include a higher density of bare optical fibers within each receptacle sub-housing 215, increasing the total number of optical connections which can be included within a given footprint. As described in greater detail below with respect to FIGS. 2-13B, treating each receptacle sub-housing 215 in a modular manner facilitates greater control over the mating forces exerted on the optical fiber cores within each first optical ferrules 212.

Plug 134 comprises plug main housing 220 (comprising side walls 220a, 220b, 220c, 220d) and at least one plug sub-housing 225. Plug main housing 220 and the at least one plug sub-housings 225 are configured to correspond to receptacle main housing 210 and the at least one receptacle sub-housing 215. Each plug sub-housing 225 can be separated by a plug sub-housing gap 224 having a width d4. In various embodiments, each plug sub-housing gap 224 between plug sub-housings 225 can have the same width d4, while in other embodiments, one or more plug sub-housing gaps 224 can have a width d4 different from one or more of the other plug sub-housing gaps 224. The plug main housing 220 comprises a first plug housing gap 226a and a second plug housing gap 226b. First plug housing gap 226a and second plug housing gap 226b ensure a space between the side walls 220a, 220b, 220c, 220d of plug main housing 220 and each of plug sub-housings 225. First plug housing gap 226a can have a width d5 between side wall 220d and a plug sub-housing 225. Although illustrated as being disposed near side wall 220d, another first plug housing gap 226a is disposed between side wall 220b and another plug sub-housing 225 (not shown in FIG. 2). Second plug housing gap 226b can have a width d6 between side wall 220a and each of plug sub-housings 225 within plug main housing 220. Although illustrated as being disposed near side wall 220a, another second plug housing gap 226b can be disposed between side wall 220c and each of plug sub-housings 225. In various embodiments, width d5 and width d6 can be the same size, whereas in other embodiments width d5 can be a different size compared to width d6. The space between each plug sub-housing 225 and side walls 220a, 220b, 220c, 220d of plug main housing 220 allows each plug sub-housing 225 to serve as a separate module within plug main housing 220.

Each plug sub-housing 225 comprises a plurality of second optical ferrules 222. In various embodiments, each second optical ferrule 222 can be configured to accept the cladded core of at least one optical fiber routed within second rack plenum 132. Second optical ferrules 222 can be similar to first optical ferrules 212 of each receptacle sub-housing 215. In various embodiments, second optical ferrules 222 of a respective plug sub-housing 225 can be configured to correlate to first optical ferrules 212 of a corresponding receptacle sub-housing 215 (i.e., the receptacle sub-housing 215 positioned above the respective plug sub-housing 225). The discussion of first optical ferrules 212 applies equally to second optical ferrules 222.

Each plug sub-housing 225 can comprise a lever tab 228. Lever tabs 228 are configured to engage its associated receptacle sub-housing 215 and plug sub-housing 225. Each plug sub-housing 225 has its own lever tab 228, allowing for each receptacle sub-housing/plug sub-housing combination to be mated together (or disengaged) independently of the other receptacle sub-housing/plug sub-housing combinations. By allowing each receptacle sub-housing 215 and corresponding plug sub-housing 225 pair to be individually mated enables greater control over the mating force applied during installation. The modular nature of each sub-housing pair reduces the impact of unbalanced application of force during installation of a monolithic array of optical ferrules. Grouping optical ferrules into smaller arrays in each sub-housing reduces the mating/unmating force, requiring less mechanical overhead (e.g., smaller lever tab) and therefore reducing the footprint per sub-housing. The smaller footprint makes it easier for a consistent force to be applied to all of the first optical ferrules 212 and second optical ferrules 222 during installation, increasing the chance of reliable connections between the optical ferrules. Although more sub-housings (consisting smaller optical ferrule arrays) may be needed for a given high number of optical ferrules, requiring larger overall footprint for all the optical ferrules to be mated in the main housings, grouping optical ferrules into larger arrays in each sub-housing can reduce the number of sub-housings for a given high number of optical ferrules, though larger sub-housings may be required. Depending on the optical ferrule types used (e.g. physical contact parallel-fiber ferrules (such as MT) or expanded beam parallel-fiber ferrules (such as PRIZM-MT)), and the total number of fibers to be supported in each ferrule, embodiments in the present disclosure allows flexible design of main housing, sub-housing and lever tab. Lever tab 228 can comprise various features and is discussed in greater detail with respect to FIGS. 4A-4D.

Figure 3B:
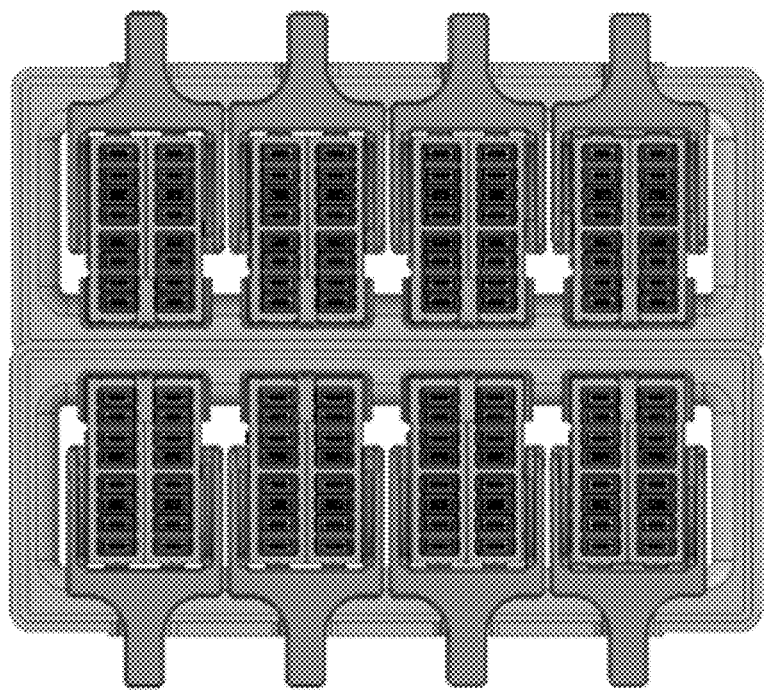
FIG. 3B is another example embodiments of plug in accordance with embodiments of the technology disclosed herein.
Figure 3A:
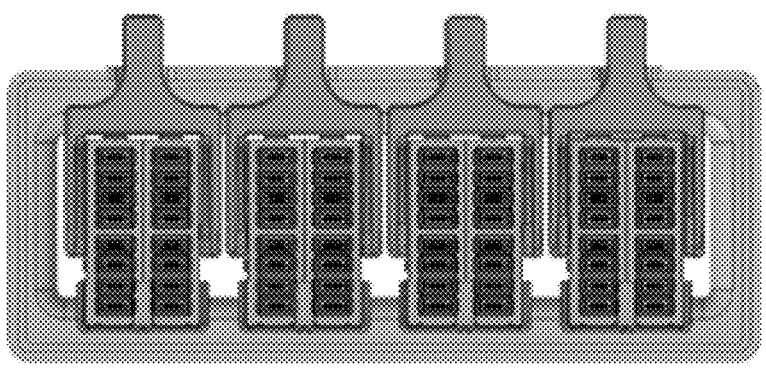
FIG. 3A is an example embodiment of plug in accordance with embodiments of the technology disclosed herein.

In various embodiments, multiple sets of sub-housings 124, 134 can be used to increase the number of optical connections. FIGS. 3A and 3B illustrate two illustrative embodiments of plug 134 in accordance with embodiments of the present disclosure. Although discussed with respect to example plug 134, the description of the illustrative embodiments of FIGS. 3A and 3B apply equally to receptacle 124 because each receptacle 124 and plug 134 are configured to mate. These examples are provided for illustrative purposes only and should not be interpreted to limit the scope of the technology disclosed herein to only the shown configurations. A person of ordinary skill in the art would understand that the modular nature of embodiments in accordance with the technology disclosed herein would enable a plurality of modular connections (i.e., receptacle 124 and plug 134 pair) to be implemented and obtain the benefits discussed herein. Moreover, although discussed with respect to an example plug, the description is equally applicable to corresponding receptacles and should be interpreted as such.

As shown in FIG. 3A, plug 134 can be configured with a single set of plug sub-housings 225. Each plug sub-housing 225 comprises an 8×2 array of second optical ferrules 222. As a non-limiting example, each second optical ferrule 222 is capable of handling 16 fibers (8 transmit fibers and 8 receive fibers). Using 16-fiber ferrules enables a plug sub-housing 225 supports 256 fibers, and a plug 134 having four plug sub-housings 225 supports total of 1,024 fibers. As a non-limiting example, if 32-fiber second optical ferrules 222 are within each plug sub-housing 225, then the total number of fibers a plug 134 can support increases to 2,048 fibers.

FIG. 3B shows plug 134 in a double set of plug sub-housings 225. In various embodiments, the double-set of plug sub-housings 225 can comprise two single sets of plug sub-housings like that discussed with respect to FIG. 3A, while in other embodiments each plug sub-housing 225 can comprise a 2×16 array of second optical ferrules 222. For a non-limiting example, using 16-fiber ferrules enables plug 134 in a double set configuration is capable of supporting 2,048 fibers. As another non-limiting example, using 32-fiber ferrules increases the number of fibers plug 134 can support to 4,096 fibers. Embodiments in accordance with embodiments disclosed herein enables high-density implementations by enabling higher capacity ferrules to be tightly grouped within a connector in various embodiments. In other embodiments, high density can be achieved by increasing the number of plug sub-housings 225, including but not limited to 16 plug sub-housings, doubling capacity of a single plug.

As discussed with respect to FIG. 2, each plug sub-housing 225 can comprise a lever tab 228, configured to enable each receptacle sub-housing/plug sub-housing combination to be mated together (or disengaged) independently of the other receptacle sub-housing/plug sub-housing combinations. FIGS. 4A-4D illustrate an example plug sub-housing 225 of plug 134 of FIG. 2 in accordance with embodiments of the present disclosure. For ease of discussion, like references may be omitted from one or more of FIGS. 4A-4D, but a person of ordinary skill in the art would understand viewing FIGS. 4A-4D that any missing references from one of FIG. 4A-4D should be interpreted as being present.

Figure 4A:
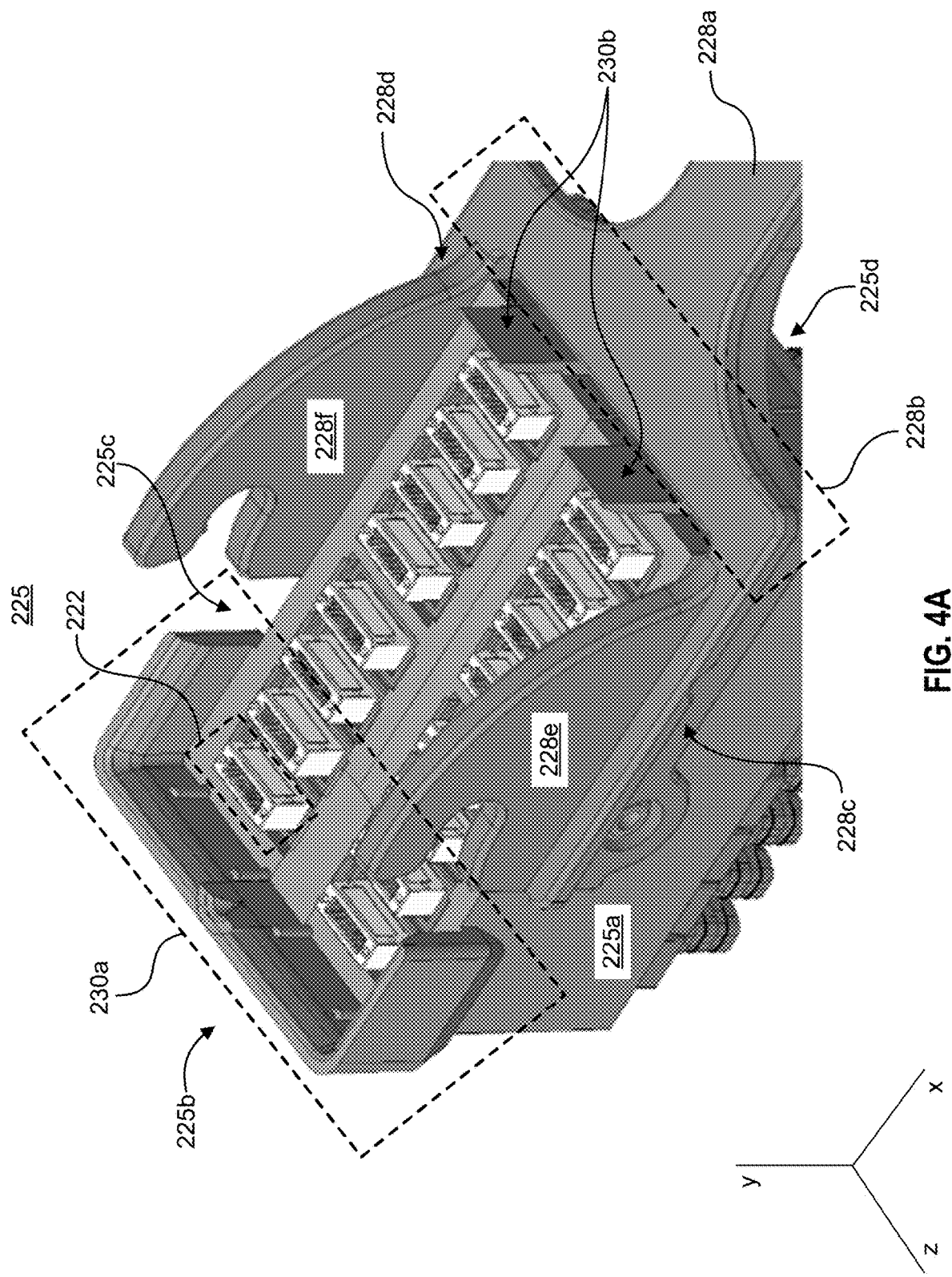
FIG. 4A is a perspective view of an example plug sub-housing in accordance with embodiments of the technology disclosed herein.

FIG. 4A shows, in greater detail, a perspective view of an example plug sub-housing 225 in accordance with embodiments of the present disclosure. As shown, plug sub-housing 225 comprises four side walls 225a, 225b, 225c, 225d, with side walls 225a and 225c being opposite of and parallel to each other, and side walls 225b and 225d being opposite of and parallel to each other. For purposes of this disclosure, side walls 225a and 225c may interchangeably be referred to as plug sub-housing sides 225a, 225c, and side walls 225b and 225d may interchangeably be referred to as plug sub-housing ends 225b, 225d. An array of plug optical ferrules 222 are disposed on a top surface of plug sub-housing 225, extending upwards (along the positive y-axis). A sub-housing shroud 230a is disposed on plug sub-housing end 225b and configured to serve as the first stage of engagement between plug sub-housing 225 and a corresponding receptacle sub-housing 215 as discussed with respect to FIG. 2. Sub-housing shroud 230a functions in conjunction with back-stops 230b to initially align receptacle sub-housing (not shown in FIG. 4A) and plug sub-housing 225 for mating when plug 134 (containing a plurality of plug sub-housing 225) and receptacle 124 (not pictured in FIG. 4A) are mated together. In various embodiments, sub-housing shroud 230a can be disposed on both plug sub-housing ends 225b, 225d, instead of including back-stops 230b.

As discussed with respect to FIG. 2, plug sub-housing 225 includes a lever tab 228. As illustrated in FIG. 4A, lever tab 228 comprises a handle 228a, a cross bar 228b, and two bail latches (each comprising an arm 228c, 228d and an engagement portion 228e, 228f, respectively). In various embodiments, first bail latch comprises a first arm 228c having a proximal end attached at a first end of the cross bar 228b, and extending out to a position at least half the length of side wall 225a. In various embodiments, second bail latch comprises a second arm 228d having a proximal end attached at a second end of the cross bar 228b, and extending out to a position at least half the length of side wall 225d. A first engagement portion 228e can extend from a top of the first arm 228c upwards (along the positive y-axis), and the second engagement portion 228f can extend from a top of the second arm 228d upwards (along the positive y-axis). In other words, like plug optical ferrules 222, the first and second engagement portions 228e, 228f, respectively, extends upwards toward the corresponding receptacle sub-housing 215 (not shown in FIG. 4A). For ease of discussion, lever tab 228 shall be described with respect to a bail latch-style lever embodiment as illustrated in FIGS. 4A-4D. A person of ordinary skill in the art, however, would understand that the technology of the present disclosure is not limited to only the illustrative embodiment but is applicable for use with other known types of securing systems known in the art. Non-limiting examples include a draw latch, spring latch, latching tab, or other latch device used in the art. Nothing in this description should be interpreted as limiting the scope of the subject matter of the present disclosure.

Figure 4B:
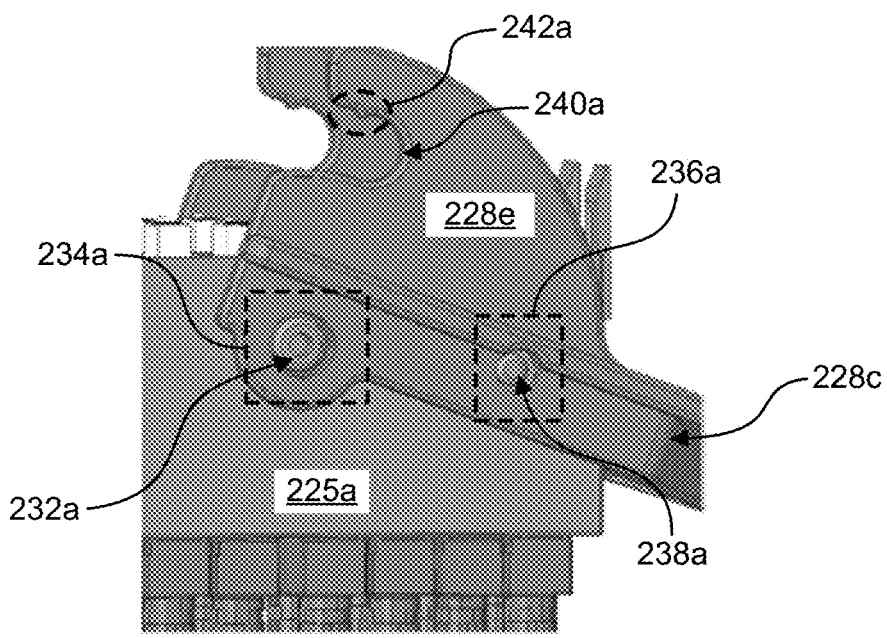
FIG. 4B is a closer view of a side wall of the example plug sub-housing illustrated in FIG. 4A.

FIG. 4B is a closer view of side wall 225a of plug sub-housing 225 illustrated in FIG. 4A. Although only showing plug sub-housing side 225a, the description is equally applicable to plug sub-housing side 225c in various embodiments, unless expressly stated otherwise. As shown in FIG. 4B, first arm 228c is moveably affixed to side wall 225a by first pivot 232a. In various embodiments, a second pivot can be used to moveably affix second arm side wall (not shown in FIG. 4B). First pivot 232a (and the second pivot) allows lever tab 228 to rotate around to move engagement portion 228e into contact with a corresponding mating component of receptacle sub-housing (not shown in FIG. 4B). First arm 228c comprises a first pivot hole 234a disposed on a distal end of first arm 228c and configured to align with a corresponding pivot hole disposed in side wall 225a. In some embodiments, first arm 228c can include a detent hole 236a configured to align with a corresponding detent hole disposed in side wall 225a. A detent pin 238a can therefore be slipped in through detent hole 236a and the detent hole in side wall 225a to keep the lever tab 228 in a first position (i.e., a disengaged position). Engagement portion 228e comprises a slot 240a configured to mate with a corresponding mating component of receptacle sub-housing. The shape and/or size of slot 240a can vary depending on the implementation, and a person of ordinary skill in the art would understand that the scope of slot 240a would not be limited to only the illustrative shape and/or size. Slot 240a can comprise a retainment feature 242a to keep engagement portion 228e in a second position (i.e., an engaged position) once mated to receptacle sub-housing. In the illustrative embodiment, retainment feature 242a comprises a hook configured to frictionally hold engagement portion 228e in the second position. In other embodiments, retainment feature 242a can comprise another type of passive retainer, while in other embodiments retainment feature 242a can comprise an actuator-type retainment feature, such as but not limited to a spring-loaded gate. A corresponding second arm similarly constructed can be disposed on the opposite and parallel side of the receptacle sub-housing (not shown in FIG. 4B).

Figure 4C:
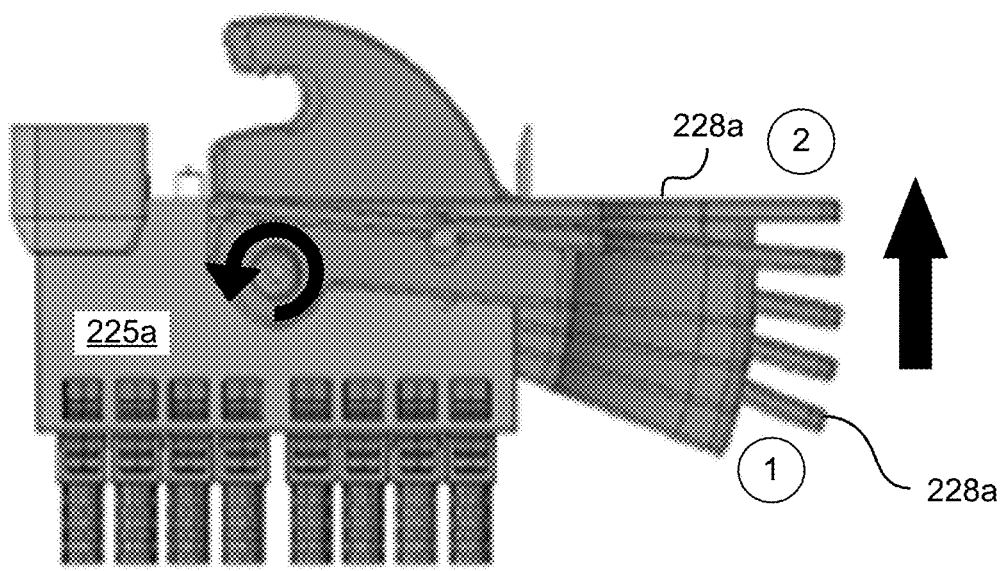
FIG. 4C shows an example motion of an example lever tab of the plug sub-housing illustrated in FIG. 4A in accordance with embodiments of the technology disclosed herein.

FIG. 4C shows an example motion of lever tab 228 to disengage or engage with receptacle sub-housing in accordance with embodiments of the present disclosure. As discussed above with respect to FIG. 4B, lever tab 228 can be placed into a first position (i.e., disengaged) and a second position (i.e., engaged). As illustrated in FIG. 4C, handle 228a of lever tab 228 is shown resting in a position below (i.e., in the negative y-axis direction) a top of side wall 225a. When an upward force (i.e., in the positive y-axis direction) is applied to handle 228a, lever tab 228 is moved into the second position, wherein lever tab 228 is even with the top of side wall 225a. As handle 228a is moved upwards, first arm 228c rotates around pivot 232a.

Figure 4D:
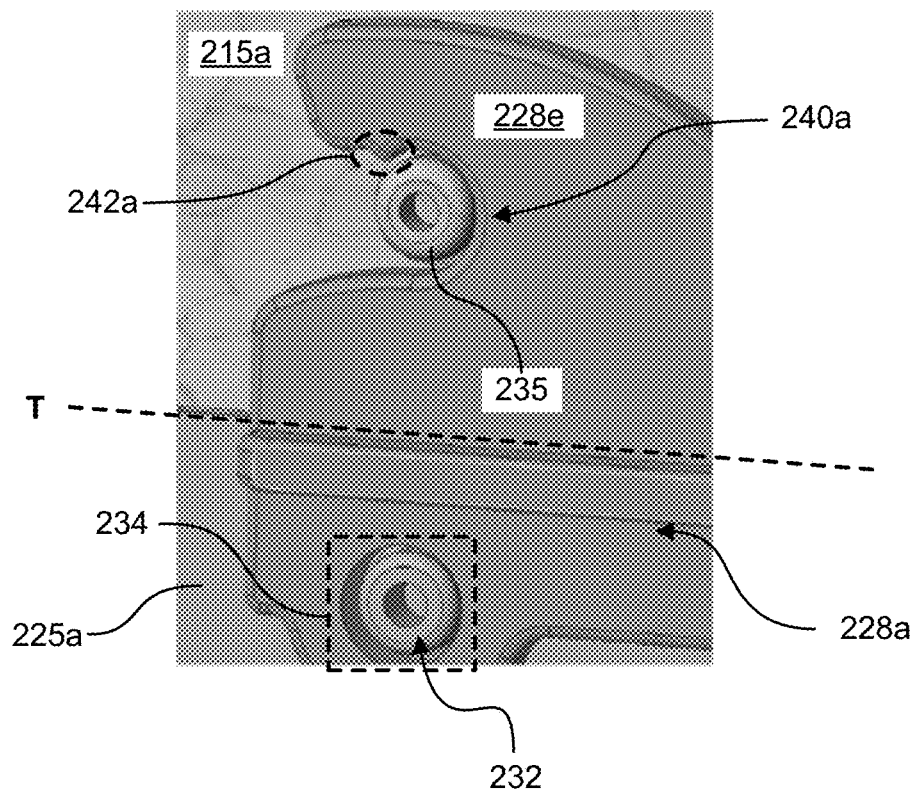
FIG. 4D shows the mating of an example engagement portion of the lever tab illustrated in FIGS. 4A-4C and an example mating component of an example receptacle sub-housing in accordance with embodiments of the technology disclosed herein.

FIG. 4D shows the mating of engagement portion 228e of FIGS. 4A-4C and an example mating component 235 of example receptacle sub-housing 215 in accordance with embodiments of the present disclosure. As illustrated, first arm 228a is even with a top of side wall 225a (as illustrated by broken line T), indicating it is in the engaged position illustrated in FIG. 4C. In various embodiments, mating component 235 can be disposed on side wall 215a of receptacle sub-housing 215. As illustrated in FIG. 4D, mating component 235 can be a bail pin 235. In other embodiments, mating component 235 can be a securing feature configured to interface with slot 242a of engagement portion 240a. In some embodiments, the size and/or shape of mating component 235 can be configured to interface with slot 242a. As lever tab 228 is moved into the engaged position (as illustrated in FIG. 4C), slot 240a can interface with mating component 235. Slot 240a can be configured such that mounting component 235 contacts a back of slot 240a when lever tab 228 is in the second position (i.e., upward motion has stopped) in some embodiments. When in the second position, retainment feature 242a may contact mating component 235 to frictionally maintain engagement portion in the second position. In some embodiments, mating component 235 may comprise a corresponding feature configured to interface with retainment feature 242a.

In some embodiments, slot 240a is configured such that, as lever tab 228 is moved into the second position (as illustrated in FIG. 2C), plug sub-housing 225 can be pulled upward to mate to a stationary receptacle sub-housing 215. In some other embodiments, receptacle sub-housing 215 can be pulled downward to mate to a stationary plug sub-housing 225. When lever tab 228 is in the first position (i.e., disengaged), receptacle sub-housing 215 can be aligned with plug sub-housing 225, but not physically mated. In this way, receptacle 124 and plug 134 can be connected (i.e., mated), but each sub-housing pair contained therein remain unmated. By allowing for modular-mating of each sub-housing pair, embodiments of the present disclosure reduce the potential for uneven application of mating force to optical ferrules across the length of receptacle 124 and plug 134. If each receptacle sub-housing and plug sub-housing were combined into a monolithic receptacle ferrule housing and plug ferrule housing, respectively, the chance of an uneven mating force being applied to a subset of the optical ferrules compared to others increases, thereby increasing the chance of the optical ferrules to be mated with unreliable optical connections. Moreover, spreading the overall mating force across the sub-housing pairs enables the use of lesser force to mate the sub-housing pairs. Slot 240a can be configured to ensure that the optical ferrules of the sub-housing pairs are connected fully and the retainment feature 242a ensures the mating to be retained in the second position.

Figure 5A:
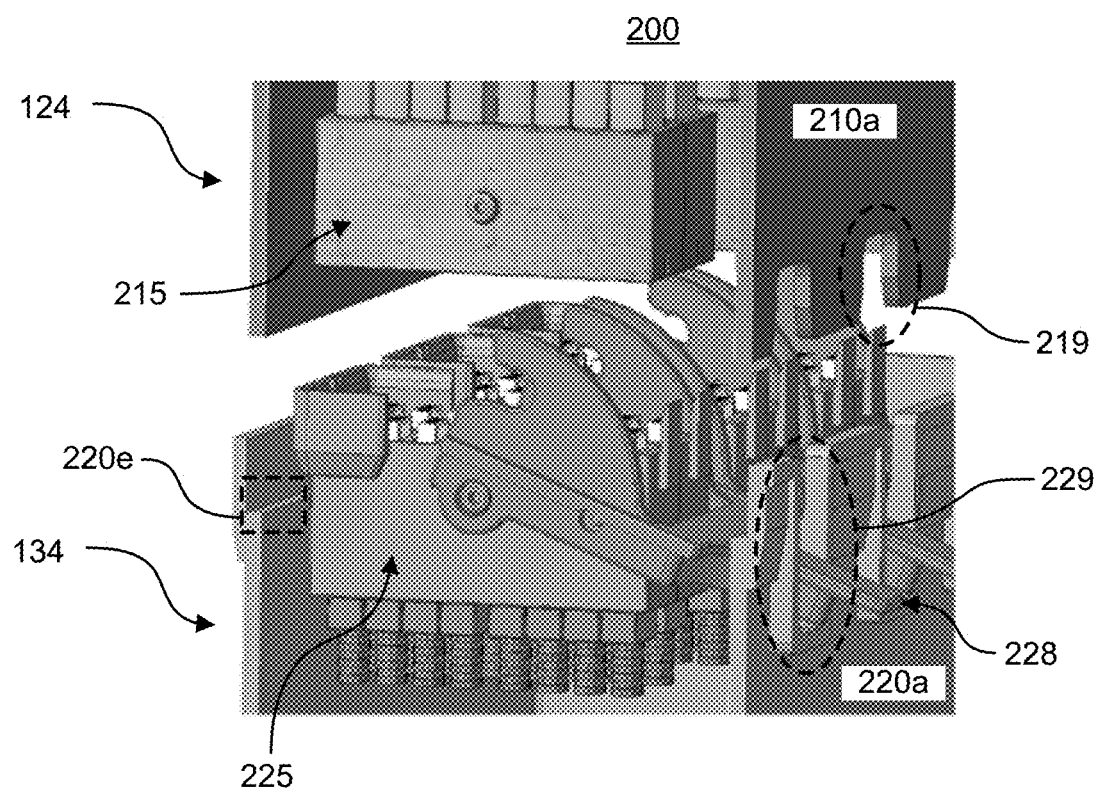
FIG. 5A is a cross-sectional perspective view of the example modular ferrule array connector system of FIG. 2.

FIG. 5A is a cross-sectional perspective view of the example modular ferrule array connector system 200 of FIG. 2. FIG. 5A shows receptacle 124 and plug 134 in alignment in preparation for mating. To facilitate mating, plug 134 can comprise a ridge 220e disposed on the interior of side walls 220a, 220b, 220c, 220d of plug main housing 220. Ridge 220e can serve as a surface for side walls 210a, 210b, 210c, 210d of receptacle main housing 210 when mated. In some embodiments, ridge 220e can assist in aligning receptacle main housing 210 and plug main housing 220 (i.e., aligning receptacle 124 and plug 134). In various embodiments, ridge 220e can be disposed on interior of side walls 220a, 220b, 220c, 220d such that, when receptacle main housing 210 and plug main housing 220 are mated (i.e., receptacle main housing 210 is inserted within interior of plug main housing 220), each receptacle sub-housing 215 is located in between sub-housing shroud 230a and back-stops 230b and receptacle optical ferrules 212 are located at a disengaged height above plug optical ferrules 222 of the corresponding plug sub-housing 225, resulting in a gap between receptacle optical ferrules 212 and plug optical ferrules 222. In various embodiments, the disengaged height can be determined based on the size and shape of slots 240 of lever tab 228 (i.e., slot 240*a* of engagement portion 228*e* and slot 240*b* of engagement portion 228*f*). By ensuring a space between each sub-housing pair after the main housing pairs are mated facilitates modular mating of the sub-housing pairs, leaving mating to occur through movement of lever tab 228.

Figure 5B:
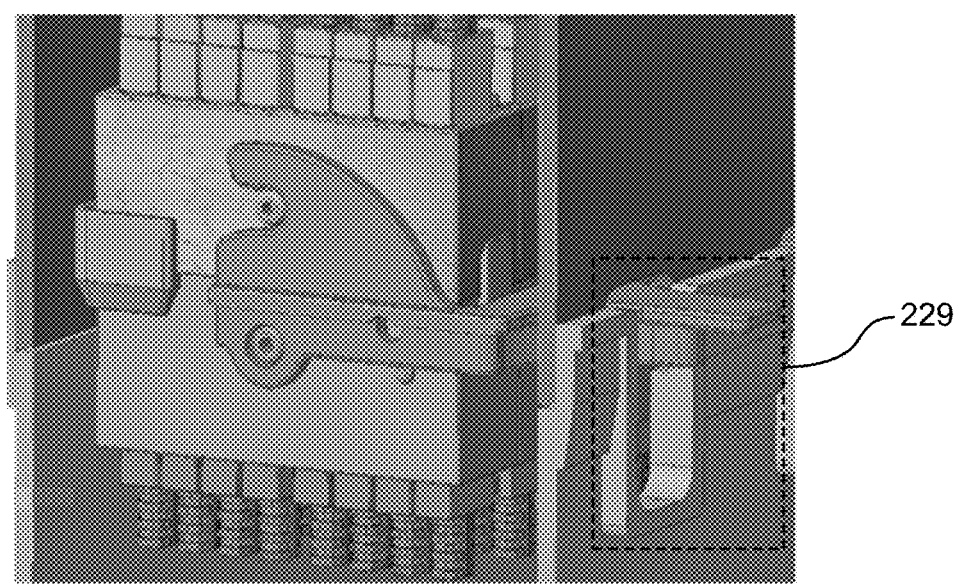
FIG. 5B shows the interaction of example lever tab openings of the example plug and example receptacle illustrated in FIGS. 4A-4D.

In various embodiments, side wall 220*a* may comprise a plurality of lever tab openings 229. Lever tab openings 229 allows movement of, or easier access to, handle 228*a* for purposes of engaging and disengaging the sub-housing pairs. Receptacle main housing side wall 210*a* can also include a plurality of lever tab openings 229 configured to correspond to lever tab openings 229 of plug main housing side wall 220*a*. FIG. 5B shows how lever tab openings 229 of plug main housing side wall 220*a* and receptacle main housing side wall 210*a* cooperate to enable handle 228 to be moved into the second position (i.e., the engaged position).

Figure 6:
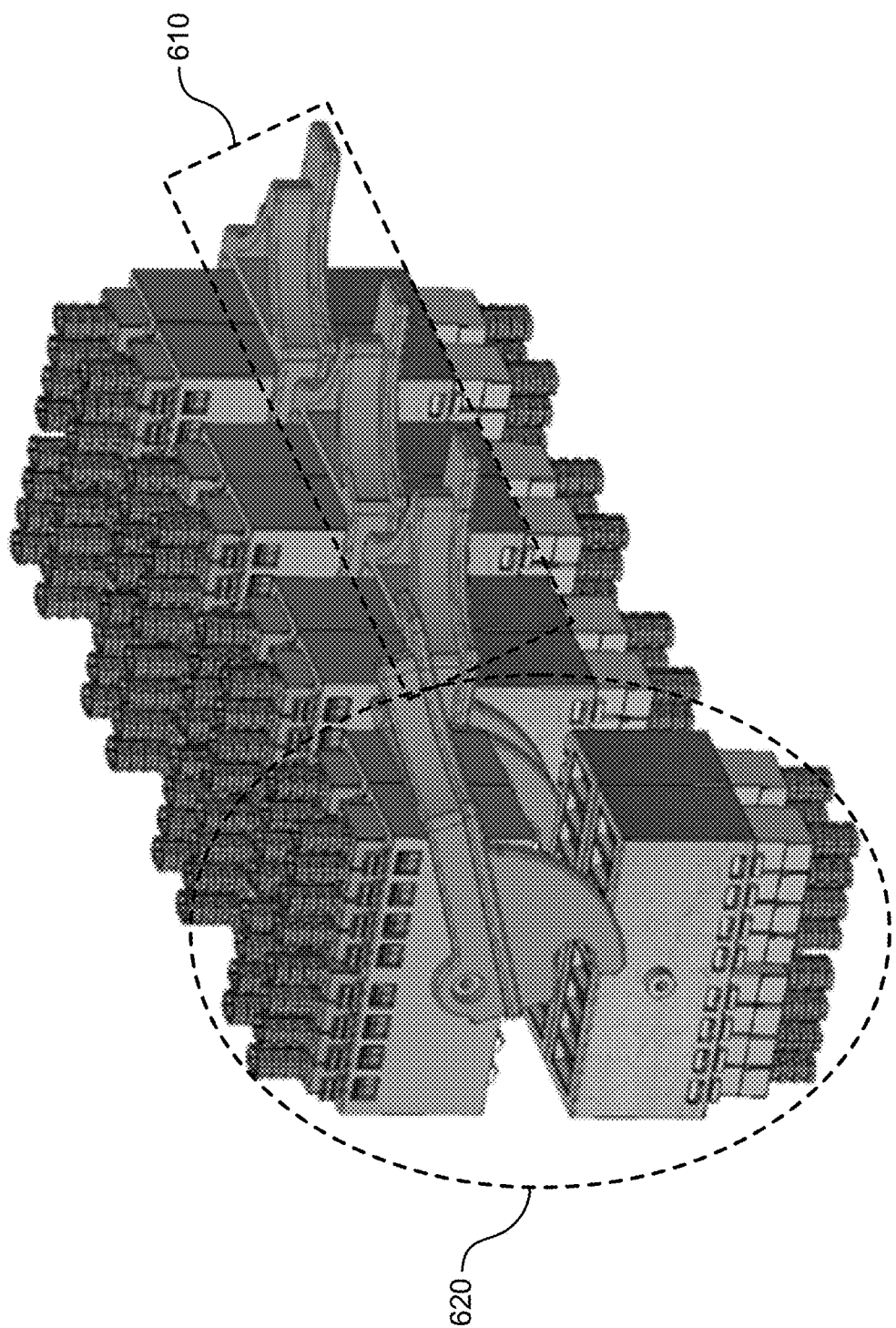
FIG. 6 is a perspective view of an example independent mating of each sub-housing pair in accordance with embodiments of the technology disclosed herein.

As discussed above, embodiments in accordance with the technology disclosed herein enables each sub-housing pair to be mated independently of each other. FIG. 6 illustrates a perspective view of the independent mating in accordance with embodiments of the present disclosure. Although FIG. 6 shows receptacle sub-housings 124 and plug sub-housings 134 rotated 180° from the alignment illustrated in the earlier figures, the operation is not different. As illustrated, lever tabs 228 of the three sub-housing pairs 610 have all been placed into the second position (i.e., the engaged position) discussed with respect to FIG. 4C, while sub-housing pair 620 is still in the first, or disengaged, position.

Figure 7A:
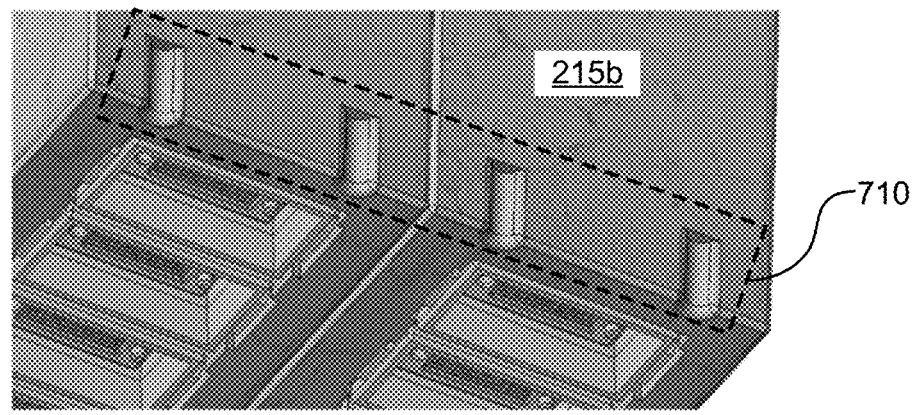
FIG. 7A illustrates example receptacle alignment features of an example receptacle sub-housing in accordance with the technology disclosed herein.
Figure 7B:
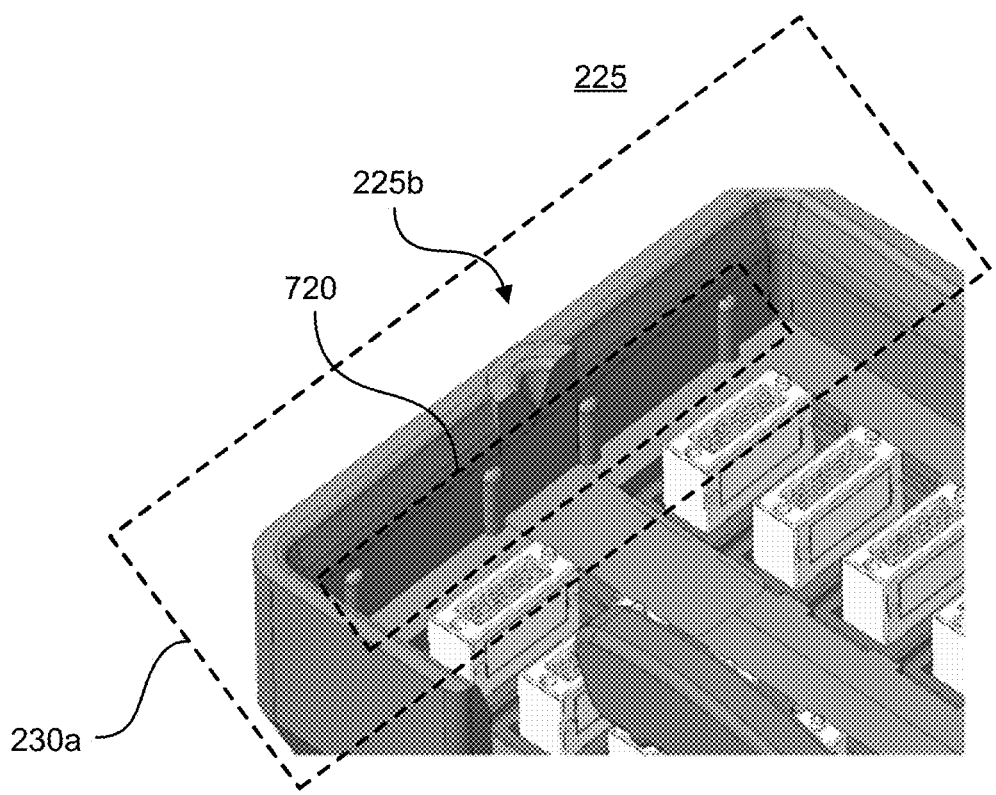
FIG. 7B illustrates example plug alignment features corresponding with receptacle alignment features illustrated in FIG. 7A.

In various embodiments, alignment of the sub-housing pairs can be assisted by alignment structures disposed on each sub-housing. FIGS. 7A and 7B show example alignment features of receptacle sub-housing 215 and plug sub-housing 225 in accordance with embodiments of the present disclosure. FIG. 7A illustrates example receptacle alignment features 710 of a receptacle sub-housing 215 in accordance with embodiments of the present disclosure. FIG. 7A is a view of the side wall 215*b* inside a cavity of a receptacle sub-housing 215. The rear end of the ferrules are shown without the fiber array. The half slot features 710 outside the cavity of a receptacle sub-housing 215 are recessed. In the illustrated embodiment, receptacle alignment features 710 comprise a plurality of half slots disposed on receptacle sub-housing end 215*b*. Although illustrated as half slots, receptacle alignment features 710 can comprise one or more different types of structures configured to assist in aligning receptacle sub-housing 215 during mating of the main housing pair and/or mating of each sub-housing pair. As a non-limiting example, receptacle alignment features 710 can comprise alignment holes disposed in receptacle sub-housing 215 and configured to interface with an alignment pin of a plug sub-housing 225. A person of ordinary skill in the art would understand the scope of the present disclosure to not be limited by the particular alignment structure implemented, and would understand that the subject matter can include any alignment system known in the art for aligning connectors.

FIG. 7B shows example plug alignment features 720 corresponding with the recess of receptacle alignment features 710 of FIG. 7A in accordance with the present disclosure. In the illustrated embodiment of FIG. 7B, plug alignment features 720 comprise a plurality of half pins configured to interface with the half slots discussed with respect to FIG. 7A. In various embodiments, the half pins can be disposed on an interior of sub-housing shroud 230*a* discussed with respect to FIG. 4A. In other embodiments, plug alignment features 720 can comprise a plurality of alignment pins or other alignment features configured to interface with the type of receptacle alignment feature 710 used in an implementation. The interaction of receptacle alignment features 710 and plug alignment features 720 assists in ensuring proper mating by preventing each sub-housing pair be mated if plug alignment features 720 do not properly interface with receptacle alignment features 710. When aligned, plug alignment features 720 can mate with receptacle alignment features 710, allowing receptacle sub-housing 215 and plug sub-housing 225 to fully engage.

Figure 8A:
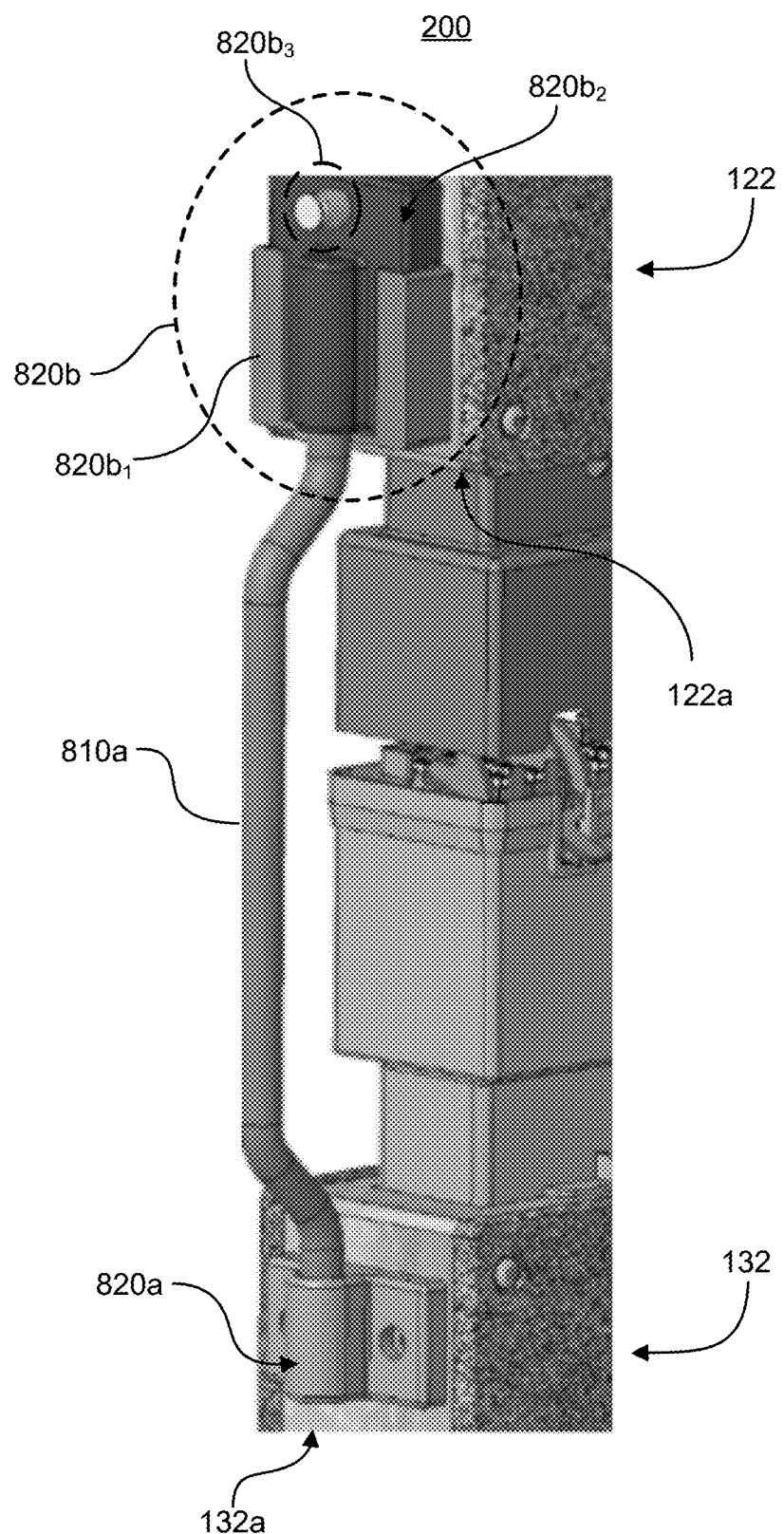
FIG. 8A illustrates an example plenum bar implemented with the example modular ferrule array connector system of FIG. 2 in accordance with embodiments of the technology disclosed herein.

In addition to the alignment features discussed above, some embodiments may include one or more alignment features external to receptacle 124 and plug 134. FIG. 8A shows an example plenum bar 810*a* implemented with example modular ferrule array connector system in accordance with embodiments of the present disclosure. A plenum bar 810*a* may be inserted into bar supports 820*a*, 820*b* disposed on a first end 132*a* of the second rack plenum 132 and a first end 122*a* of the first rack plenum 122, respectively. In the illustrated embodiment, bar support 820*a* is affixed to first end 132*a* and configured with a hole to accept a first end of plenum bar 810*a*, and bar support 820*b* comprises a slot 820*b*$_1$ and a removable bracket 820*b*$_2$. In various embodiments, a first end of plenum bar 810*a* can be inserted into bar support 820*a* and, when first rack plenum 122 and second rack plenum 132 are roughly aligned, removable bracket 820*b*$_2$ can be slid over plenum bar 810*a* and into slot 820*b*$_1$ to physically secure plenum bar 810*a* to first rack plenum 122. Removable bracket 820*b*$_2$ may have a spring-loaded button 820*b*$_3$ that may engage with a corresponding recess (not shown in FIG. 8A) on first rack plenum 122. Spring-loaded button 820*b*$_3$ retains removable bracket 820*b*$_2$ within slot 820*b*$_1$, allowing plenum bar 810*a* to be stably retained in bar supports 820*a*, 820*b*. Spring-loaded button 820*b*$_3$ may be depressed to unlatch removable bracket 820*b*$_2$ from first rack plenum 122, when plenum bar 810*a* is to be disconnected between first rack plenum 122 and second rack plenum 132.

Figure 8B:
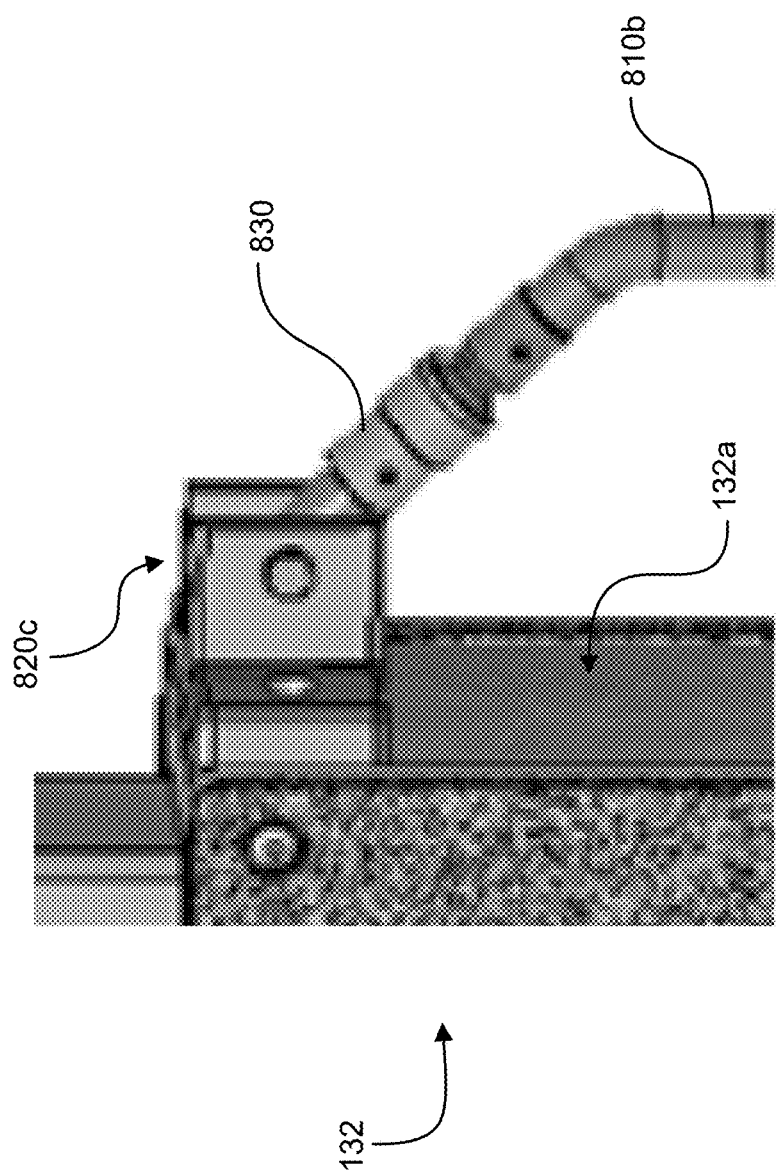
FIG. 8B shows an example pivot joint in accordance with embodiments of the technology disclosed herein.

FIG. 8B illustrates an example pivot plenum bar 810*b* in accordance with embodiments of the present disclosure. Rather than bar support 820*a* discussed with respect to FIG. 8A, a pivot joint 820*c* is disposed on a first end 132*a* of second rack plenum 132. In various embodiments, pivot joint 820*c* can be permanently connected to a proximal end of pivot plenum bar 810*b* such that pivot plenum bar 810*b* remains attached to second rack plenum 132 when latched to plenum bar claps 820*d* (as shown in FIG. 8C) or when detached from plenum bar claps 820*d*. In various embodiments, pivot joint 820*c* can provide a pivot point around which pivot plenum bar 810*b* can rotate from a latched position to a tucked position (as shown in FIGS. 9A-9D) where pivot plenum bar 810*b* is stored when not latched to plenum bar clasp 820*d*. When latched, pivot plenum bar 810*b* can be configured to serve as a handle for the combined plenum structure comprising first rack plenum 122 (not shown in FIG. 8B) and second rack plenum 132 in various embodiments. In various embodiments, pivot joint 820*c* can be connected to pivot plenum bar 810*b* through a joint connector 830. In some embodiments, joint connector 830 can be a part of pivot joint 820*c*, while in other embodiments joint connector 830 can be part of pivot plenum bar 810*b*.

FIGS. 9A-9D shows how pivot plenum bar 810*b* can assist in connecting receptacle 124 and plug 134 in accordance with embodiments of the present disclosure. In FIG. 9A, pivot plenum bar 810*b* is shown in a tucked position. A distal end of pivot plenum bar 810*b* (i.e., the end of pivot plenum bar 810*a* away from pivot joint 820*c*) is latched to a disengaged clasp 820*e*. Disengaged clasp 820*e* can be similar to plenum bar clasp 820*d* discussed with respect to FIG. 8B, only disclosed on a distal end of first end 132*a* of second rack plenum 132 (i.e., a point on first end 132*a* away from pivot joint 820*c*). When first rack plenum 122 and second rack plenum 132 are to be connected, pivot plenum bar 810*b* is moved into a latched position as shown in FIG. 9B. Plenum bar 810*b* is removed from disengaged clasp 820*e* and rotated around pivot joint 820*c* into a latched position (i.e., a distal end of pivot plenum bar 810*b* is latched with plenum bar clasp 810*d*). Once latched, pivot plenum bar 810*b* assists in maintaining a rough alignment of first rack plenum 122 and second rack plenum 132 such that receptacle 124 and plug 134 can be mated easier. With the two plenums kept in rough alignment by plenum bar 810, plug 134 can be lifted up to mate with receptacle 124 as shown in FIG. 9D. In the illustrated embodiment, plug 134 can be movable within second rack plenum 132 in the vertical direction (along the y-axis). In other embodiments, receptacle 124 can be movable within first rack plenum 122, while in other embodiments both plug 134 and receptacle 124 can be movable vertically in second rack plenum 132 and first rack plenum 122, respectively. Allowing vertical motion of plug 134 and/or receptacle 124 can provide clearance between plug 134 and receptacle 124 while first rack plenum 122 and second rack plenum 132 are moved into position for mating.

As discussed above, first rack plenum 122 and second rack plenum 132 can be movable. FIGS. 10A and 10B illustrate another example environment 1000 and how the plenums can be pivoted from a first position into a second position in accordance with embodiments of the present disclosure. Environment 1000 is similar to environment 100, except that rack 110 includes two enclosures, first enclosure 1010*a* and second enclosure 1010*b*, rather than just two node sets. Enclosures within racks can be used to provide power, cooling, and management infrastructure, allowing for easier deployment of modular sets of a number of nodes 101. As shown in FIG. 10A, first enclosure 1010 comprises a first node-set 120 and second enclosure 1010*b* comprises a second node-set 130, each node-set 120, 130 comprising a respective plurality of nodes 101. Nodes 101 within first enclosure 1010*a* and second enclosure 1010*b* may be disposed on a front side of first enclosure 1010*a* and second enclosure 1010*b* (i.e., the non-facing side of rack 110 in FIGS. 10A and 10B). A first midplane 151 separates the front side of first enclosure 1010*a* from the back side of first enclosure 1010*a*, where a first fiber tray set 121 comprising a plurality of fiber trays 103 can be disposed. In various embodiments, nodes 101 of first node-set 120 can be orthogonally oriented with respect to fiber trays 103 within first fiber tray set 121. Optical fibers from first node-set 120 are routed to first fiber tray set 121 through midplane optical blindmate connectors (not shown in FIGS. 10A and 10B) through midplane 151 in first enclosure 1010*a*. Similarly, a second midplane 153 separates the front side of second enclosure 1010*b* from the back side of second enclosure 1010*b*, where a second fiber tray set 131 comprising a plurality of fiber trays 103 can be disposed. In various embodiments, nodes 101 of second node-set 120 can be orthogonally oriented with respect to fiber trays 103 within second fiber tray set 131. Optical fibers from second node-set 120 are routed to second fiber tray set 131 through midplane optical blindmate connectors (not shown in FIGS. 10A and 10B) through midplane 153 of second enclosure 1010*b*

The fibers of nodes 101 in first node-set 120 are routed out of first enclosure 1010*a* through first fiber tray set 121, then into first rack plenum 122, and the fibers of nodes 101 in second node-set 130 are routed out of second enclosure 1010*b* through second fiber tray set 131, then into second rack plenum 122. This conceptually moves the optical connections on the back of the nodes 101 from each midplane 151, 153 inside first enclosure 1010*a* and second enclosure 1010*b*, respectively, to outside of the enclosures. As shown by moving from FIG. 10A to FIG. 10B, first rack plenum 122 can be rotated from a first position (an unmated position) to a second position (a mated position). First rack plenum 122 is rotated around first plenum pivot 122*b* to correspond with second rack plenum 132 in various embodiments. In some embodiments, first rack plenum 122 can be pivotable around first plenum pivot 122*b*, second enclosure plenum 132 can be pivotable around second plenum pivot 132, or a combination thereof. To connect first rack plenum 122 with second rack plenum 132 (i.e., to place the plenums in the second, mated position), first rack plenum 122 can be pivoted to be rotated in the horizontal direction (along the x-axis) to a position above second rack plenum 132, such as the position shown in FIG. 1. Allowing the plenums to swing into and out of position facilitates easier installation and maintenance of environment 1000.

Figure 11A:
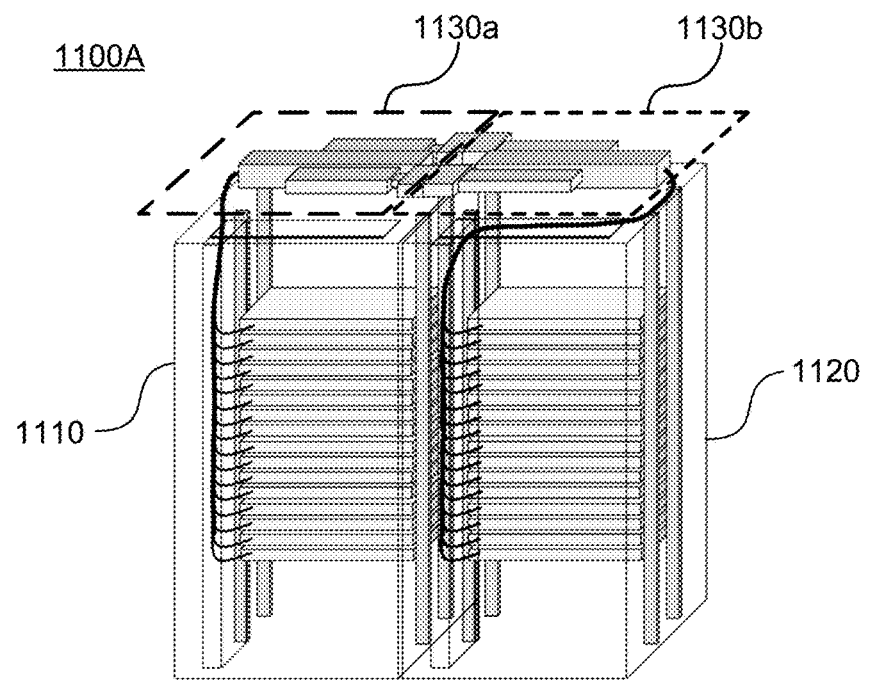
FIG. 11A illustrates an example above-the-rack configuration in accordance with embodiments of the technology disclosed herein.
Figure 11B:
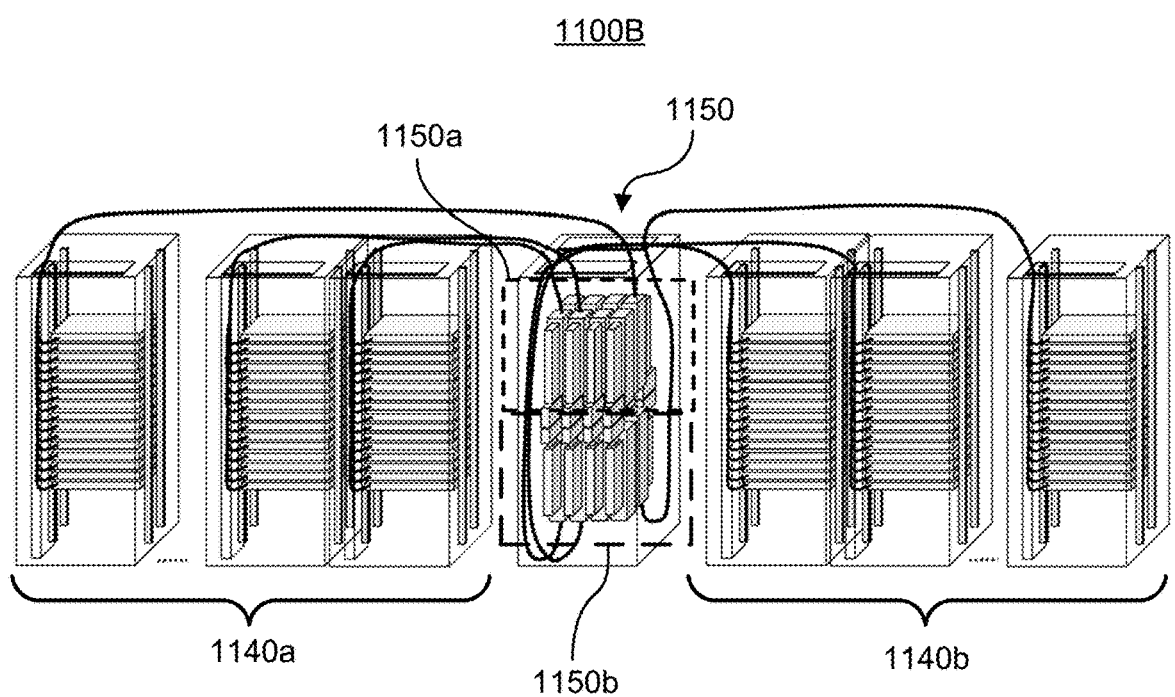
FIG. 11B illustrates an example plenum-as-rack configuration in accordance with embodiments of the technology disclosed herein.

By moving the optical connections traditionally found in the midplane of an enclosure to the exterior of the enclosure, and by the use of bare fibers and high-density optical blindmate connectors in receptacle 124 and plug 134, embodiments of the present disclosure allows for rack-scale or row-scale high-density blind mate connection, reducing the need for complex and expensive fiber shuffle designs and untenable cable routing (i.e., massive cable waterfalls). The blind-mating technology disclosed herein further allows for optical connections to be configured in a variety of different configurations. As a non-limiting example, environment 100 of FIG. 1 illustrates a rear intra-rack plenum configuration in accordance with embodiments of the present disclosure. As another non-limiting example, the optical connections can be moved to above the rack to connect two separate racks (i.e., inter-rack connection), as shown in FIG. 11A. Each rack 1110, 1120 has a rack plenum 1130*a*, 1130*b* disposed on a top of each rack 1110, 1120, respectively. In this way, two racks 1110, 1120 can be interconnected in an easier manner, without the need for traditional fiber shuffles or other devices within the racks, which takes up space and increases the size and cost of the implementation. As another non-limiting example, FIG. 11B illustrates a middle-of-racks implementation 1110B in accordance with embodiments of the present disclosure. As shown in FIG. 11B, a plenum rack 1150 is disposed between a first set of racks 1140*a* and a second set of racks 1140*b*. Plenum rack 1150 comprises a first plurality of plenums 1150*a* comprising a plenum associated with each rack of the first set of racks 1140*a*, and a second plurality of plenums 1150*b* comprising a plenum associated with each rack of the second set of racks 1140*b*. In this way, sets of racks can be interconnected in a more efficient way using a rack 1150 as a "plenum" as shown in FIG. 11B.

Figures 12A, 12B:
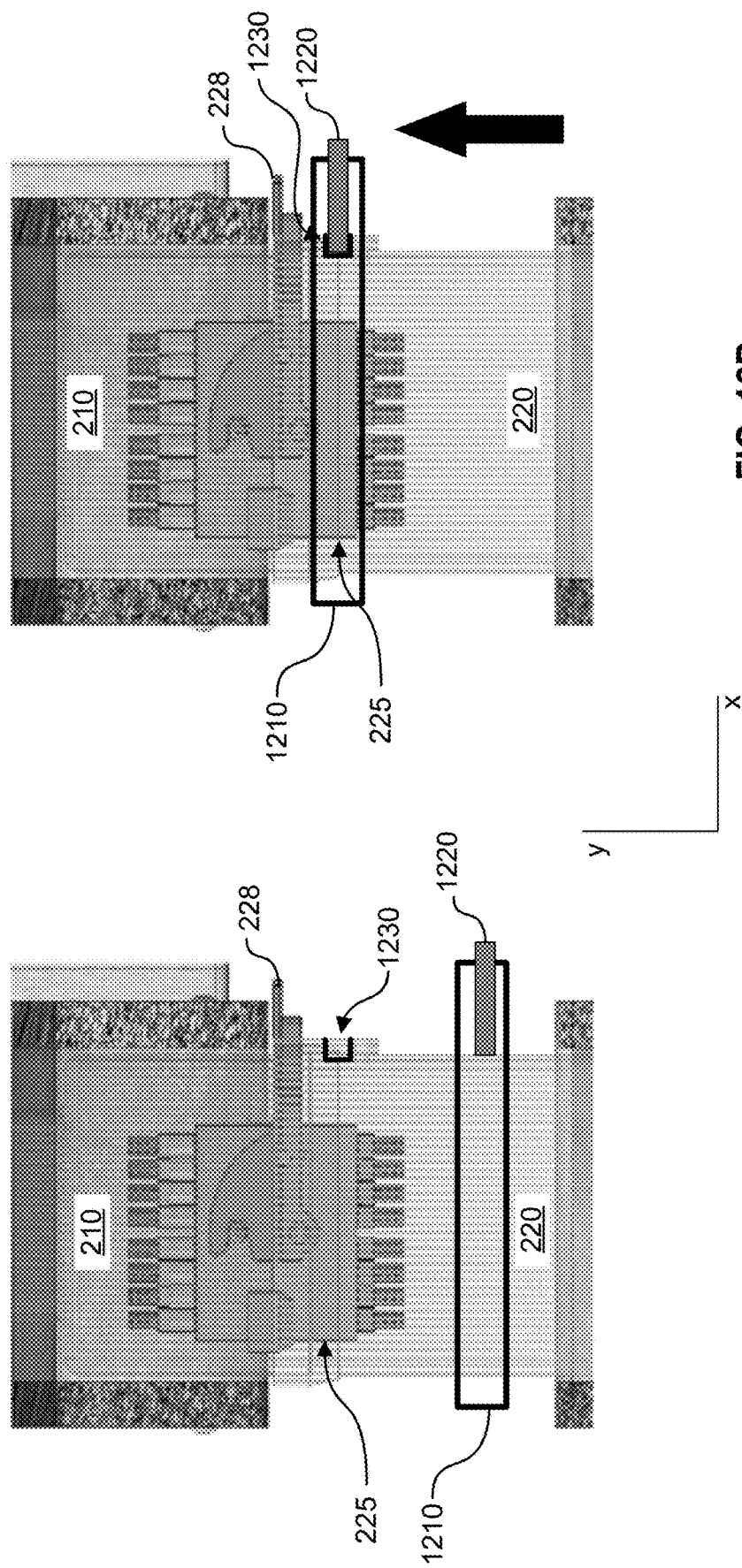
FIG. 12A illustrates an example security sleeve in a first position accordance with the technology disclosed herein.
FIG. 12B illustrates the example security sleeve of FIG. 12A in a locking position in accordance with embodiments of the technology disclosed herein.

Embodiments in accordance with the present disclosure can include various security features. With the optical connections being moved from the midplane of an enclosure to the exterior of the enclosure, and within a rack or across multiple racks, it is important to ensure that the optical connections are protected from tampering and/or accidently removal during servicing. FIGS. 12A and 12B illustrate an example security sleeve 1210 in accordance with embodiments of the present disclosure. As illustrated in FIG. 12A, security sleeve 1210 can encircle plug main housing 220. In various embodiments, security sleeve 1210 can be in a first position below plug sub-housing 225 prior to mating of the sub-housing pairs. Security sleeve 1210 can comprise a locking mechanism, the locking mechanism can include a bolt 1220 and a bolt box 1230 in various embodiments. Bolt 1220 can be configured to interface with bolt box 1230 when security sleeve 1210 is moved into a second position underneath lever tab 228. In various embodiments, bolt box 1230 can be disposed in plug main housing 220. To secure each lever tab 228 of the sub-housing pairs when engaged, security sleeve 1210 is moved upwards in the vertical direction until bolt 1220 interfaces with bolt box 1230. In some embodiments, bolt 1220 can comprise a spring bolt having a spring component within security sleeve 1210 configured to frictionally secure bolt 1220 within security sleeve 1210. When security sleeve 1210 is moved, into the locking position, bolt 1220 is pulled to compress the spring component, and is released when aligned with bolt box 1230. When released, the spring decompresses and frictionally secure bolt 1220 within bolt box 1230. In various embodiments, bolt 1220 can be removable from security sleeve 1210 and, when locking security sleeve 1210 in position, bolt 1220 can be inserted when security sleeve 1210 is aligned with bolt box 1230. To ensure that someone cannot release security sleeve 1210 when in the locking position, a sleeve key or combination lock can be attached to bolt 1220 such that bolt 1220 cannot be moved while the sleeve lock is present.

Figure 12C:
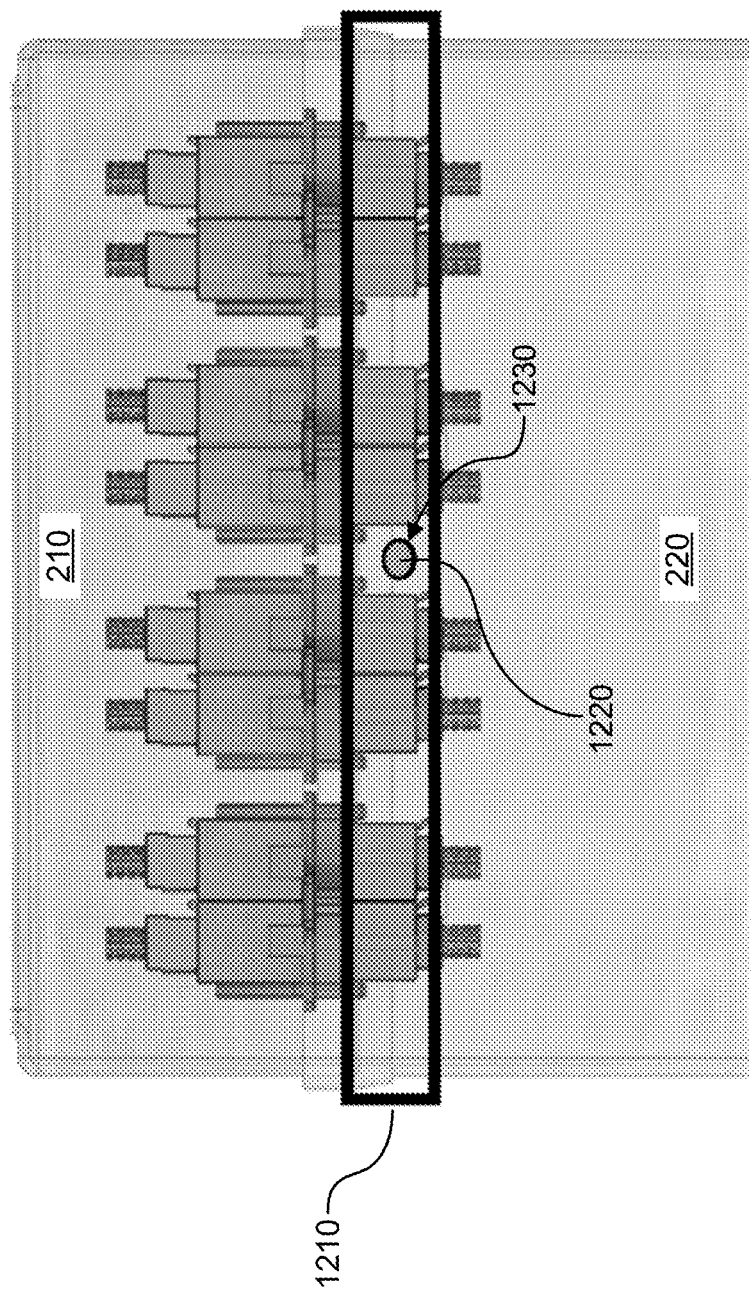
FIG. 12C illustrates another view of the example security sleeve in the locking position illustrated in FIG. 12B.

As shown in FIG. 12B, when security sleeve 1210 is locked into the locking position, it is not possible to move lever tab 228 into the first position discussed with respect to FIG. 4C. That is, the sub-housing pair cannot be disengaged, providing confidence in the optical connection and its security. If someone attempts to move lever tab 228, security sleeve 1210 serves as a block, restricting lever tab 228 from being moved. Although illustrated as being disposed on the same side as lever tab 228, in some embodiments bolt box 1230 can be disposed on any other side wall of plug main housing 220. Bolt 1220 can be disposed on the side of security sleeve 1210 aligned with bolt box 1230. As illustrated in FIG. 12C, bolt box 1230 can be disposed in plug main housing 220 between two of plug sub-housings 225. In other embodiments, a plurality of bolts 1220 and bolt boxes 1230 can be disposed in security sleeve 1210 and plug main housing 220, respectively.

Figure 13A:
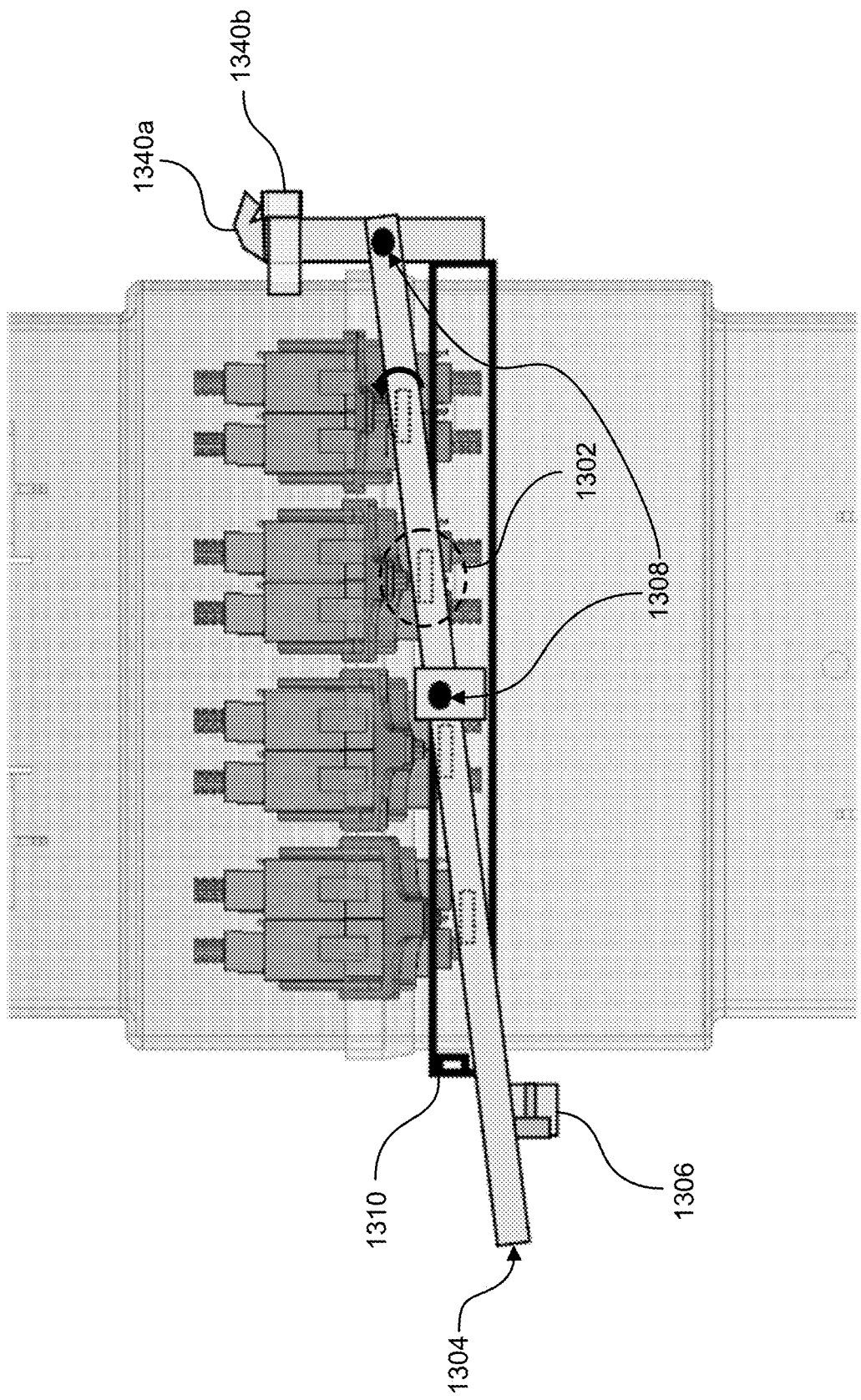
FIG. 13A illustrates an example lever action engaging security sleeve in accordance with embodiments of the technology disclosed herein.
Figure 13B:
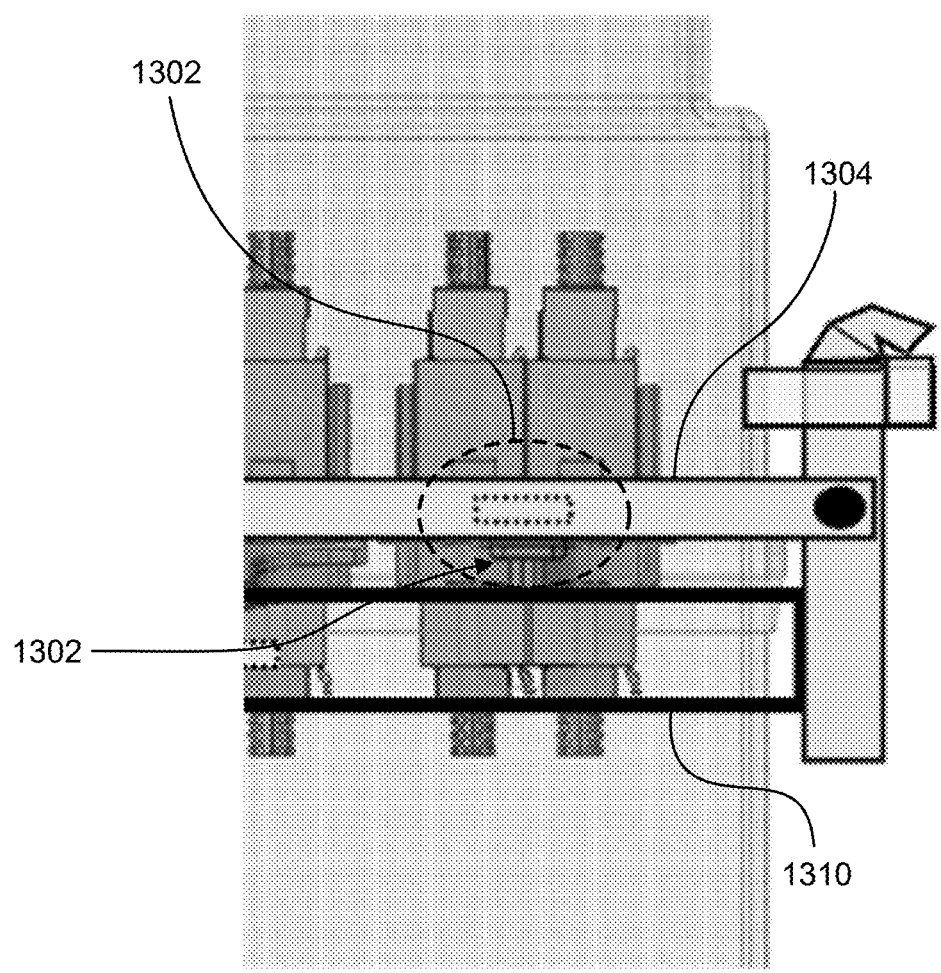
FIG. 13B illustrates an example engaged position of lever action engaging security sleeve of FIG. 13A.

In some embodiment, security sleeve 1210 can include additional features to engage and disengage the sub-housing pairs when moving into and out of the locking position, respectively. FIGS. 13A and 13B illustrates an example lever action engaging security sleeve 1310 in accordance with embodiments of the present disclosure. As shown in FIG. 13A, security sleeve 1310 is similar to security sleeve 1210, with the addition of sleeve lever 1304 connected to security sleeve 1310. In various embodiments, sleeve lever 1304 can be connected to security sleeve 1310 through a rotatable joint 1308. In some embodiments, sleeve lever 1304 can comprise a plurality of dual-action clutches 1302. Each dual-action clutch 1302 can be configured to apply the force necessary to move lever tab 228 of each plug sub-housing 225 both into the engage position and the disengaged position. As sleeve lever 1304 is raised into position, each dual-action clutch 1302 contacts its associated lever tab 228 and begins to apply pressure to move lever tab 228 into the engaged position. As sleeve lever 1304 continues to move upwards, each dual-action clutch 1302 begins to rotate such that it is still in contact with lever tab 228, but when sleeve lever 1304 is in its final position dual-action clutch 1302 is positioned above lever tab 228, as illustrated in FIG. 13B. In this way, when sleeve lever 1304 is lowered (to disengage the sub-housing pairs), each dual-action clutch 1302 is in position to apply pressure to the top of lever tab 228 to disengage each plug sub-housing 225 from receptacle sub-housing 225.

Sleeve lever 1304 can be configured to enable each sub-housing pair to be engaged and disengaged at different intervals during the mating process. As shown in FIG. 13A, sleeve lever 1304 is anchored on a security sleeve interlock latch 1340a in various embodiments. A rotatable joint 1308 is fixed in position on security sleeve interlock latch 1340a such that sleeve lever 1304 is fixed on a proximal end. When in a non-locked position, the distal end of sleeve level 1304 rests below the proximal end, resulting in dual-action clutches 1302 contacting the respective lever tab 228 at different times during motion of the sleeve lever 1304. Security sleeve interlock latch 1340a can be configured to mate with an interlock catch 1340b. In various embodiments, security sleeve interlock latch 1340a can be used to move security sleeve 1310 into an initial position below lever tabs 228 of the plug sub-housings 225 and to maintain security sleeve 1304 in the start position until sleeve lever 1304 is operated. In various embodiments, interlock catch 1340b can include a position for a locking mechanism, such as a key or combination lock, to ensure that security sleeve interlock latch 1340a cannot be tampered without authorization.

Sleeve lever 1304 can also include a lever lock 1306 disposed on the distal end of sleeve lever 1304. Lever lock 1306 can be similar to the locking mechanism of security system 1210 discussed with respect to FIGS. 12A-12C. When sleeve lever 1304 is in its locking position, lever lock 1306 can be used to keep sleeve lever 1304 in that position.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:
1. A modular optical connector system comprising:
   a receptacle configured to connect to a plug, the receptacle comprising a plurality of receptacle sub-housings, each receptacle sub-housing comprising:
      an array of receptacle optical ferrules;
      a first mating component disposed on a first side wall of the receptacle sub-housing; and a second mating component disposed on a second side wall of the receptacle sub-housing; and
the plug comprising a plurality of plug sub-housings, each plug sub-housing corresponding with one of the plurality of receptacle sub-housings and forming a sub-housing pair, each plug sub-housing comprising:
an array of plug optical ferrules configured to mate with the receptacle optical ferrules;
a lever tab rotatably connected to a first side wall and a second side wall of the plug sub-housing;
wherein each sub-housing pair remains unconnected when the receptacle is connected with the plug, and wherein each sub-housing pair is configured to be independently mated by moving the lever tab of each respective plug sub-housing from a first position to a second position.

2. The modular optical connector system of claim 1,
the plug comprising a plug main housing having a first side wall comprising a plurality of lever tab openings;
the receptacle comprising a receptacle main housing having a first wall comprising a plurality of lever tab openings,
wherein each of the plurality of lever tab openings of the first wall of the receptacle main housing are configured to correspond to a respective lever tab opening of the plurality of lever tab openings of the first wall of the plug main housing.

3. The module optical connector system of claim 1, each lever tab comprising:
a handle connected to a cross bar;
a first arm having a proximal end attached at a first end of the cross bar, the first arm extending to a distal end at a position at least half a length the first side wall of the plug sub-housing; and
a second arm having a proximal end attached at a second end of the cross bar, the second arm extending to a distal end at a position at least half a length of the second side wall of the plug sub-housing,
wherein the length of the first sidewall is the same as the length of the second side wall, the first arm is rotatably connected to the first side wall by a first pivot, and the second arm is rotatably connected to the second side wall by a second pivot.

4. The module optical connector system of claim 2, each lever tab further comprising:
a first engagement portion of the first arm, the first engagement portion comprising a slot configured to mate with the first mating component of a respective receptacle sub-housing; and
a second engagement portion of the second arm, the second engagement portion comprising a slot configured to mate with the second mating component of the respective receptacle sub-housing.

5. The module optical connector system of claim 3, wherein the slot of the first engagement portion and the slot of the second engagement portion are dimensioned such that the plug sub-housing and the receptacle sub-housing are mated when the lever tab is moved into the second position.

6. The module optical connector system of claim 1, each plug sub-housing comprising a sub-housing shroud disposed on a third side wall of the plug sub-housing and one or more back stops on a fourth side wall of the plug sub-housing.

7. The module optical connector system of claim 1, further comprising:
each receptacle sub-housing further comprising a plurality of receptacle alignment features disposed on a third side wall of the receptacle sub-housing; and
each plug sub-housing further comprising a plurality of plug alignment features disposed on a third side wall of the plug sub-housing,
wherein the receptacle alignment features are configured to interface with the plug alignment features of the plug sub-housing to assist in aligning the receptacle sub-housing and the plug sub-housing.

8. A system comprising:
a first node-set comprising a first plurality of nodes;
a second node-set comprising a second plurality of nodes;
a first rack plenum associated with the first node-set, the first rack plenum comprising a receptacle comprising a plurality of receptacle sub-housings;
a second rack plenum associated with the second node-set, the second rack plenum comprising a plug comprising a plurality of plug sub-housings, each plug sub-housing corresponding to a respective one of the plurality of receptacle sub-housings to form a sub-housing pair,
wherein the receptacle and the plug are configured to optically connect the first node-set and the second node-set, and wherein each sub-housing pair comprises a modular assembly configured to be mated independently of each other sub-housing pair.

9. The system of claim 8, the first node-set being disposed in a rack comprising the second node-set, the first rack plenum and the second rack plenum being disposed on a rear of the rack.

10. The system of claim 8, further comprising:
the first node-set being disposed in a first rack, the first rack plenum being disposed on a top of the first rack; and
the second node-set being disposed in a second rack, the second rack plenum being disposed on a top of the second rack.

11. The system of claim 8, further comprising:
the first node-set comprising a rack in a first set of racks;
the second node-set comprising a rack in a second set of racks,
the first rack plenum comprising a plenum of a first plurality of plenums of a plenum rack; and
the second rack plenum comprising a plenum of a second plurality of plenums of the plenum rack,
wherein the plenum rack is disposed between the first set of racks and the second set of racks, and wherein each plenum of the first plurality of plenums are configured to mate with each plenum of the second plurality of plenums to optically connect the first set of racks to the second set of racks.

12. The system of claim 8, further comprising a plenum bar configured to align the first rack plenum and the second rack plenum.

13. The system of claim 12, a first end of the plenum bar affixed to a pivot joint disposed on a first side of the second rack plenum and configured to be rotatable from a disengaged clasp disposed at a distal end of the first side of the second rack plenum from the pivot joint to a plenum bar clasp disposed on a first side of the first rack plenum.

14. The system of claim 8, wherein the first rack plenum is rotatable around a first plenum pivot.

15. The system of claim 14, wherein the second rack plenum is stationary.

16. The system of claim 14, wherein the second rack plenum is rotatable around a second plenum pivot.

17. The system of claim 8, wherein the plug is movable in the vertical direction from a first position to a second position to mate with the receptacle when the first rack plenum and the second rack plenum are aligned.

18. A system comprising:
- a receptacle configured to connect to a plug, the receptacle comprising a plurality of receptacle sub-housings, each receptacle sub-housing comprising:
  - an array of receptacle optical ferrules;
  - a first mating component disposed on a first side wall of the receptacle sub-housing; and
  - a second mating component disposed on a second side wall of the receptacle sub-housing; and
- the plug comprising a plurality of plug sub-housings, each plug sub-housing corresponding with one of the plurality of receptacle sub-housings and forming a sub-housing pair, the plug further comprising a security sleeve;
- each plug sub-housing comprising:
  - an array of plug optical ferrules configured to mate with the receptacle optical ferrules;
  - a lever tab rotatably connected to a first side wall and a second side wall of the plug sub-housing;
- wherein each sub-housing pair remains unconnected when the receptacle is connected with the plug,
- wherein each sub-housing pair is configured to be independently mated by moving the lever tab of each respective plug sub-housing from a first position to a second position, and
- wherein the security sleeve is configured to move into a locking position underneath each lever tab of the plurality of receptacle sub-housings to stop each lever tab from being moved from the second position.

19. The system of claim 18, the security sleeve comprising a locking mechanism.

20. The system of claim 18, the security sleeve further comprising:
- a sleeve lever rotatably connected to the security sleeve through a rotatable joint;
- the sleeve lever comprising a plurality of dual-action clutches, each dual-action clutch configured to apply a force on a respective lever tab of a receptacle sub-housing to move the lever tab into the second position when sleeve lever is moved in a vertical direction towards the receptacle,
- wherein each dual-action clutch is configured to contact its respective lever tab at a different point during a motion of the sleeve lever in the vertical direction towards the receptacle.

* * * * *